(12) United States Patent
Tarama

(10) Patent No.: US 9,724,613 B2
(45) Date of Patent: Aug. 8, 2017

(54) GAME DEVICE, CONTROL METHOD OF GAME DEVICE, PROGRAM, AND INFORMATION STORAGE MEDIUM

(75) Inventor: Naoki Tarama, Osaka (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 680 days.

(21) Appl. No.: 14/349,328

(22) PCT Filed: Aug. 13, 2012

(86) PCT No.: PCT/JP2012/070611
§ 371 (c)(1),
(2), (4) Date: Apr. 2, 2014

(87) PCT Pub. No.: WO2013/051342
PCT Pub. Date: Apr. 11, 2013

(65) Prior Publication Data
US 2014/0248956 A1    Sep. 4, 2014

(30) Foreign Application Priority Data
Oct. 5, 2011    (JP) .................................. 2011-220749

(51) Int. Cl.
*A63F 13/219* (2014.01)
*A63F 13/814* (2014.01)
(Continued)

(52) U.S. Cl.
CPC .......... *A63F 13/814* (2014.09); *A63F 13/213* (2014.09); *A63F 13/44* (2014.09); *A63F 13/46* (2014.09)

(58) Field of Classification Search
CPC .......... A63F 13/10; A63F 13/44; A63F 13/46; A63F 13/40; A63F 2300/61; A63F 2300/638; A63F 2300/8047
(Continued)

(56) References Cited

U.S. PATENT DOCUMENTS 7,331,856 B1    2/2008  Nakamura et al.
8,444,464 B2 *  5/2013  Boch ..................... A63F 13/428
                                                          463/7
(Continued)

FOREIGN PATENT DOCUMENTS

CN    102029070 A    4/2011
EP    0972550 A2     1/2000
(Continued)

OTHER PUBLICATIONS

The partial translation of previously submitted reference "Kenichiroh Yasuhara, Bravo Music, Sony Computer Entertainment Inc., Oct. 18, 2001" filed on Oct. 27, 2014, acting as supplemental concise explanation of relevance.
(Continued)

*Primary Examiner* — Michael Cuff
(74) *Attorney, Agent, or Firm* — Hubbs, Enatsky & Inoue PLLC

(57) ABSTRACT

Provided is a game device capable of enabling a user to more readily perceive the rhythm of music when playing a game in which the player performs a game operation to the music. In the game configured so that the player performs the game operation to the music, based on reference timing data indicating a reference timing at which the player should perform the game operation, a game device indicates the reference timing to the player by moving a guide image on
(Continued)

a game screen from a generation position to a target position while changing a direction of the guide image in accordance with a beat of the music.

15 Claims, 25 Drawing Sheets

(51) Int. Cl.
*A63F 13/213* (2014.01)
*A63F 13/46* (2014.01)
*A63F 13/44* (2014.01)

(58) Field of Classification Search
USPC ................................................ 463/7, 31
See application file for complete search history.

(56) References Cited

U.S. PATENT DOCUMENTS

| | | | |
|---|---|---|---|
| 8,702,509 B2 | 4/2014 | Yamamoto | |
| 2002/0002411 A1 | 1/2002 | Higurashi et al. | |
| 2008/0113698 A1* | 5/2008 | Egozy | A63F 13/12 463/7 |
| 2008/0139307 A1* | 6/2008 | Ueshima | A61B 5/0002 463/31 |
| 2008/0200224 A1* | 8/2008 | Parks | G10H 1/368 463/7 |
| 2008/0311969 A1* | 12/2008 | Kay | A63F 13/10 463/7 |
| 2010/0113117 A1* | 5/2010 | Ku | A63F 13/10 463/7 |
| 2010/0137048 A1* | 6/2010 | Kim | G09B 15/003 463/7 |
| 2010/0151948 A1* | 6/2010 | Vance | A63F 13/06 463/43 |
| 2011/0077081 A1 | 3/2011 | Nakamura | |
| 2011/0306397 A1* | 12/2011 | Fleming | A63F 13/46 463/7 |
| 2012/0143358 A1* | 6/2012 | Adams | G06F 3/011 700/92 |
| 2013/0005464 A1 | 1/2013 | Yamamoto | |

FOREIGN PATENT DOCUMENTS

| | | |
|---|---|---|
| JP | 2000-218046 A | 8/2000 |
| JP | 2001-070639 A | 3/2001 |
| JP | 2001-162044 A | 6/2001 |
| JP | 2001-321564 A | 11/2001 |
| JP | 2003-205174 A | 7/2003 |
| JP | 2007-097861 A | 4/2007 |
| JP | 2011-189011 A | 9/2011 |
| JP | 2011-189012 A | 9/2011 |
| JP | 2011-189073 A | 9/2011 |

OTHER PUBLICATIONS

English Translation of Written Opinion of the International Searching Authority for PCT/JP2012/070611 accompanied with PCT/IB/373 and PCT/IB/338 dated Apr. 17, 2014, acting as concise explanation of submitted reference(s).
"Bravo Music Christmas Edition/Cho Meikyoku Ban", Dengeki PS2, Jan. 25, 2002, vol. 8, No. 1, p. 37.
'Let's Bravo Music' Game Manual, Sony Computer Entertainment Inc., Dec. 25, 2003 (received date), pp. 02, 04, 17.
The partial translation of Office Action for corresponding Japanese Patent Application No. 2013-144805 dated on Aug. 5, 2014.
Kenichiroh Yasuhara, Bravo Music, Sony Computer Entertainment Inc., Oct. 18, 2001, pp. 1-19. See partial translation of Office Action for corresponding Japanese Patent Application No. 2013-144805 dated on Aug. 5, 2014.
English Translation of Written Opinion of the International Searching Authority for PCT/JP2012/070023 accompanied with PCT/IB/373 and PCT/IB/338 dated Mar. 27, 2014.
Partial translation of an Office Action for App. JP2012-169665, dated Oct. 30, 2012.
International Search Report for PCT/JP2012/070023, dated Oct. 30, 2012.

\* cited by examiner

FIG.5

| BODY PART | THREE-DIMENSIONAL COORDINATES |
|---|---|
| HEAD | $P1(X_{P1}, Y_{P1}, Z_{P1})$ |
| NECK | $P2(X_{P2}, Y_{P2}, Z_{P2})$ |
| LEFT UPPER ARM | $P3(X_{P3}, Y_{P3}, Z_{P3})$ |
| RIGHT UPPER ARM | $P4(X_{P4}, Y_{P4}, Z_{P4})$ |
| LEFT LOWER ARM | $P5(X_{P5}, Y_{P5}, Z_{P5})$ |
| RIGHT LOWER ARM | $P6(X_{P6}, Y_{P6}, Z_{P6})$ |
| BACK | $P7(X_{P7}, Y_{P7}, Z_{P7})$ |
| LEFT THIGH | $P8(X_{P8}, Y_{P8}, Z_{P8})$ |
| RIGHT THIGH | $P9(X_{P9}, Y_{P9}, Z_{P9})$ |
| LEFT SHIN | $P10(X_{P10}, Y_{P10}, Z_{P10})$ |
| RIGHT SHIN | $P11(X_{P11}, Y_{P11}, Z_{P11})$ |
| ⋮ | ⋮ |

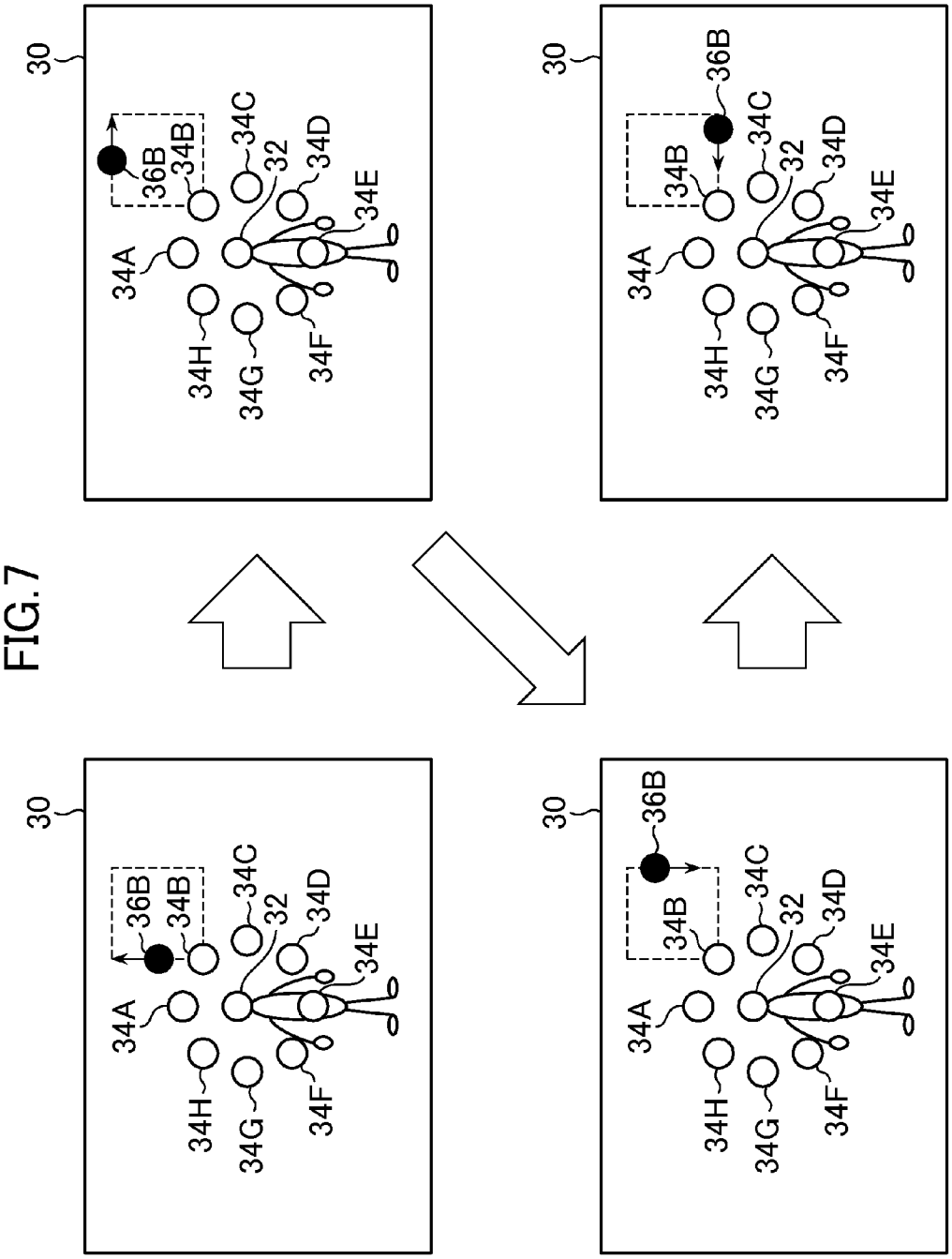

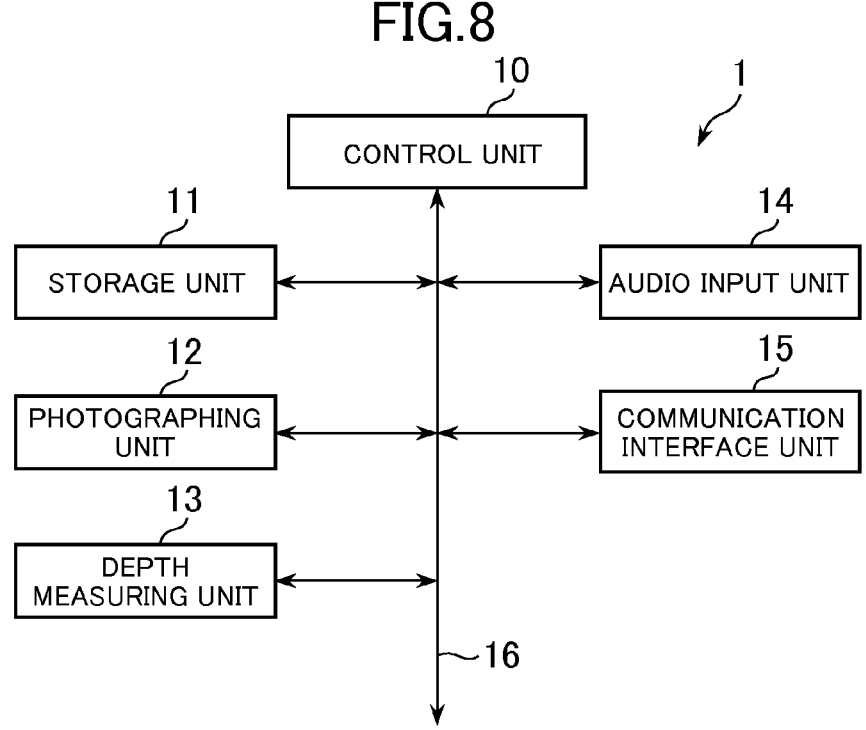
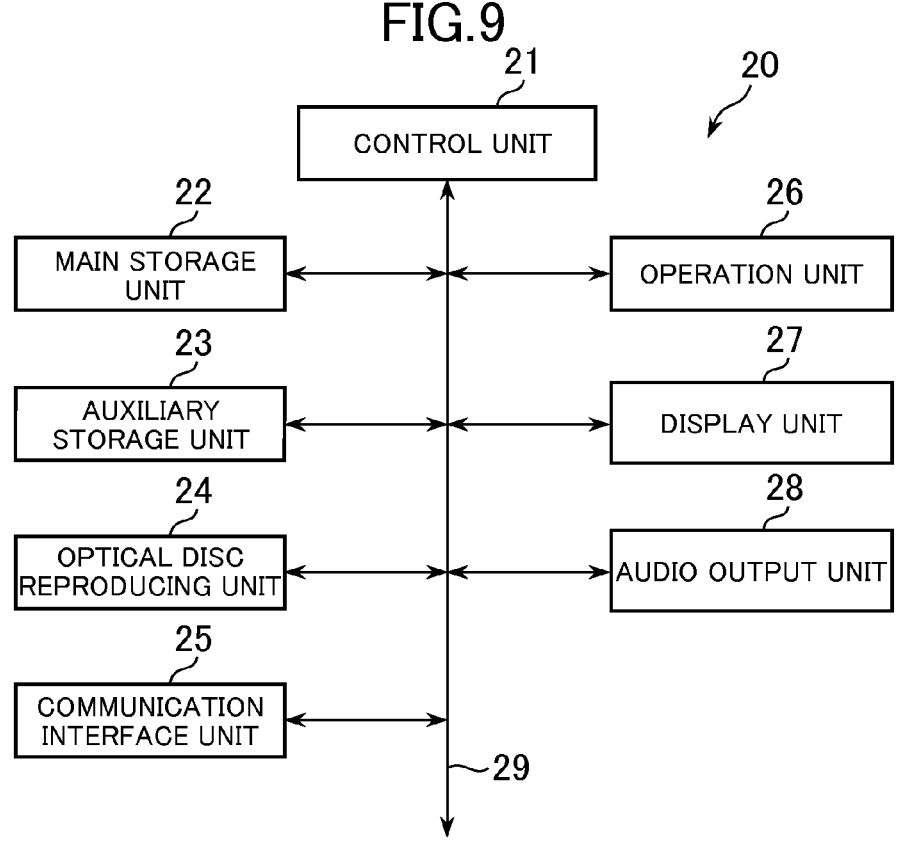

| TIMING DIFFERENCE(ΔT) | EVALUATION |
|---|---|
| 0≦ \|ΔT\| <T1 | MARVELOUS |
| T1≦ \|ΔT\| <T2 | PERFECT |
| T2≦ \|ΔT\| <T3 | GREAT |
| T3≦ \|ΔT\| <T4 | GOOD |
| T4≦ \|ΔT\| <T5 | ALMOST |
| T5≦ \|ΔT\| | BOO |

FIG.23
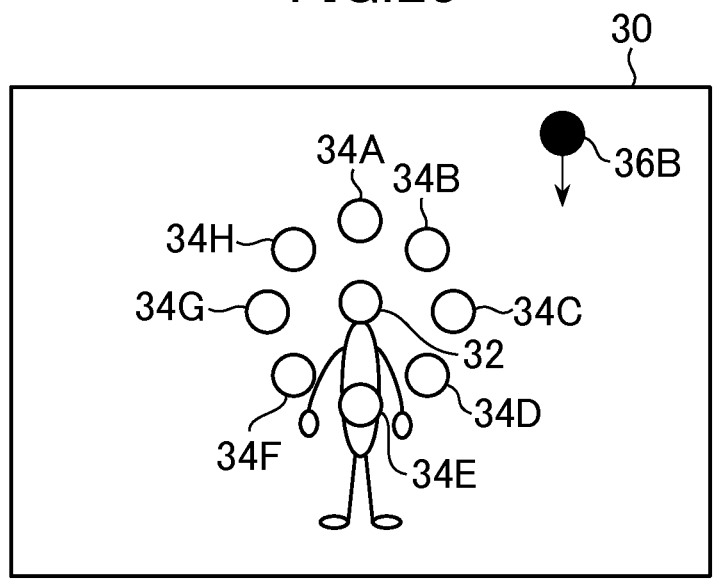
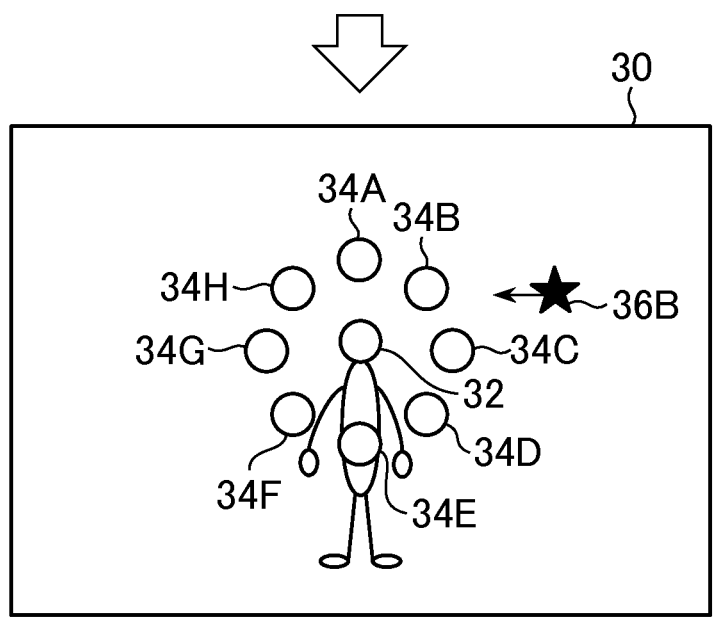

| CHANGE IN PLAYER POSITION INFORMATION | MOVING DISTANCE AND SPEED |
|---|---|
| SMALL | NEAR, SLOW |
| NORMAL | NORMAL |
| LARGE | FAR, FAST |

FIG.29

| CONDITION | METHOD OF CHANGING |
|---|---|
| SCORE IS WITHIN PREDETERMINED RANGE | A ↔ B |

FIG.31
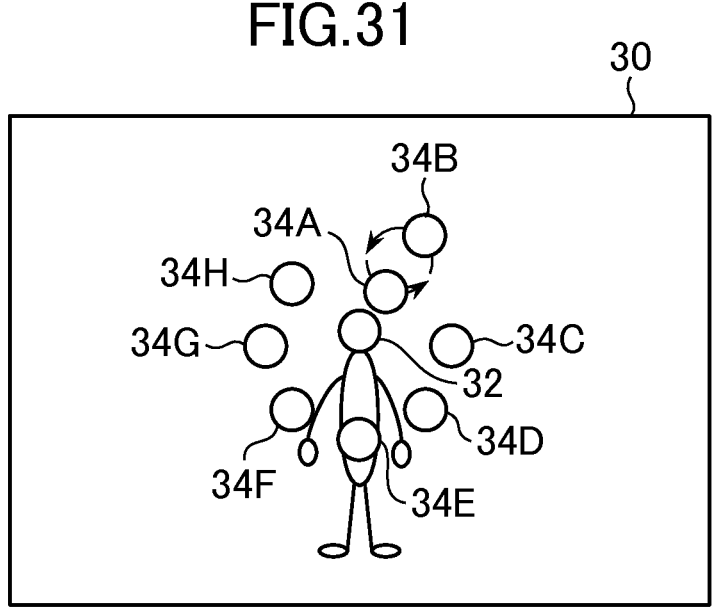
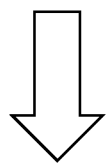
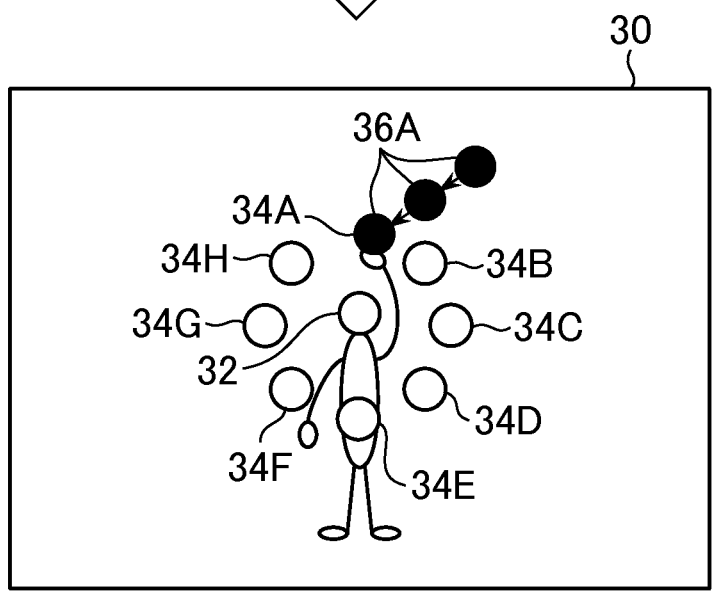

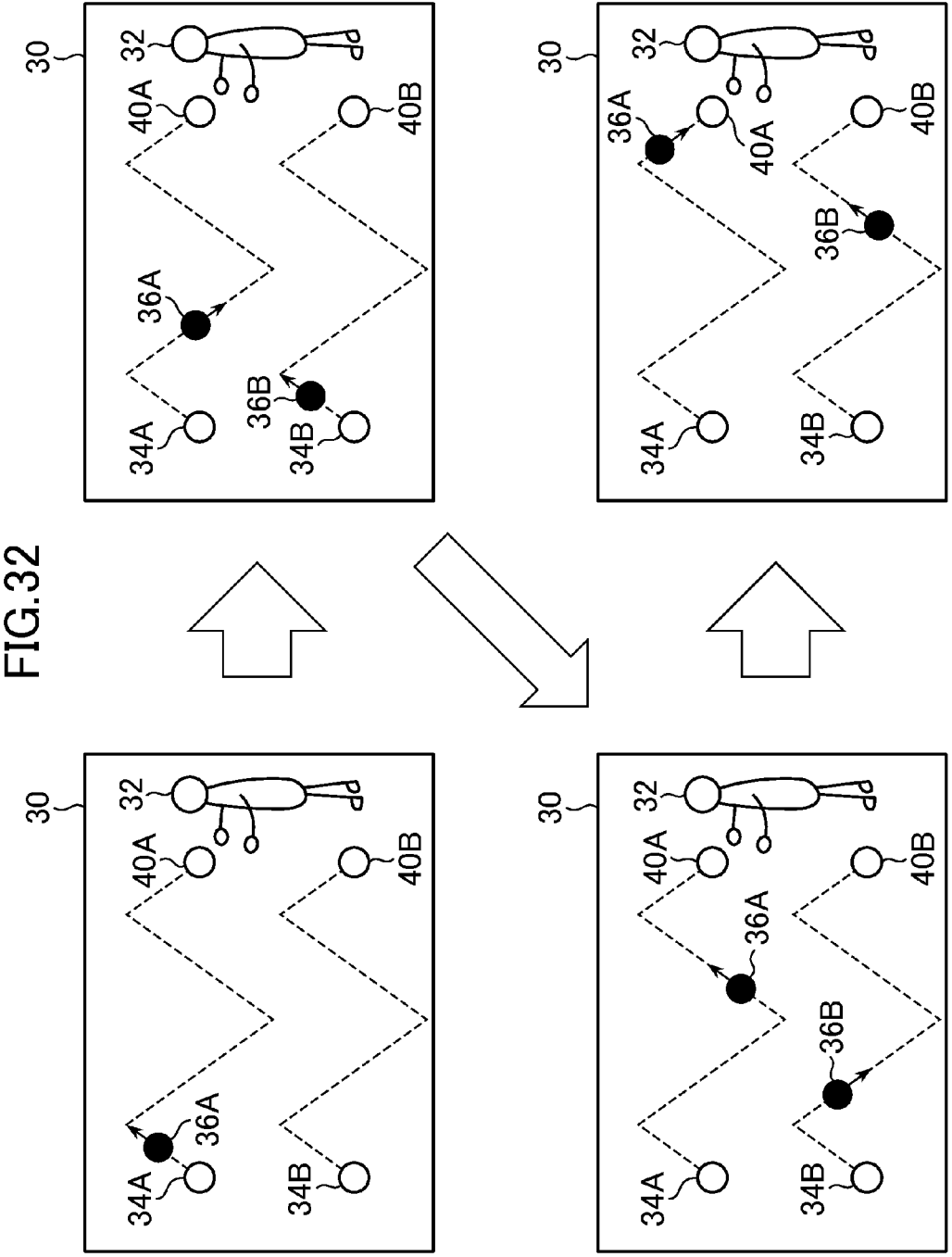

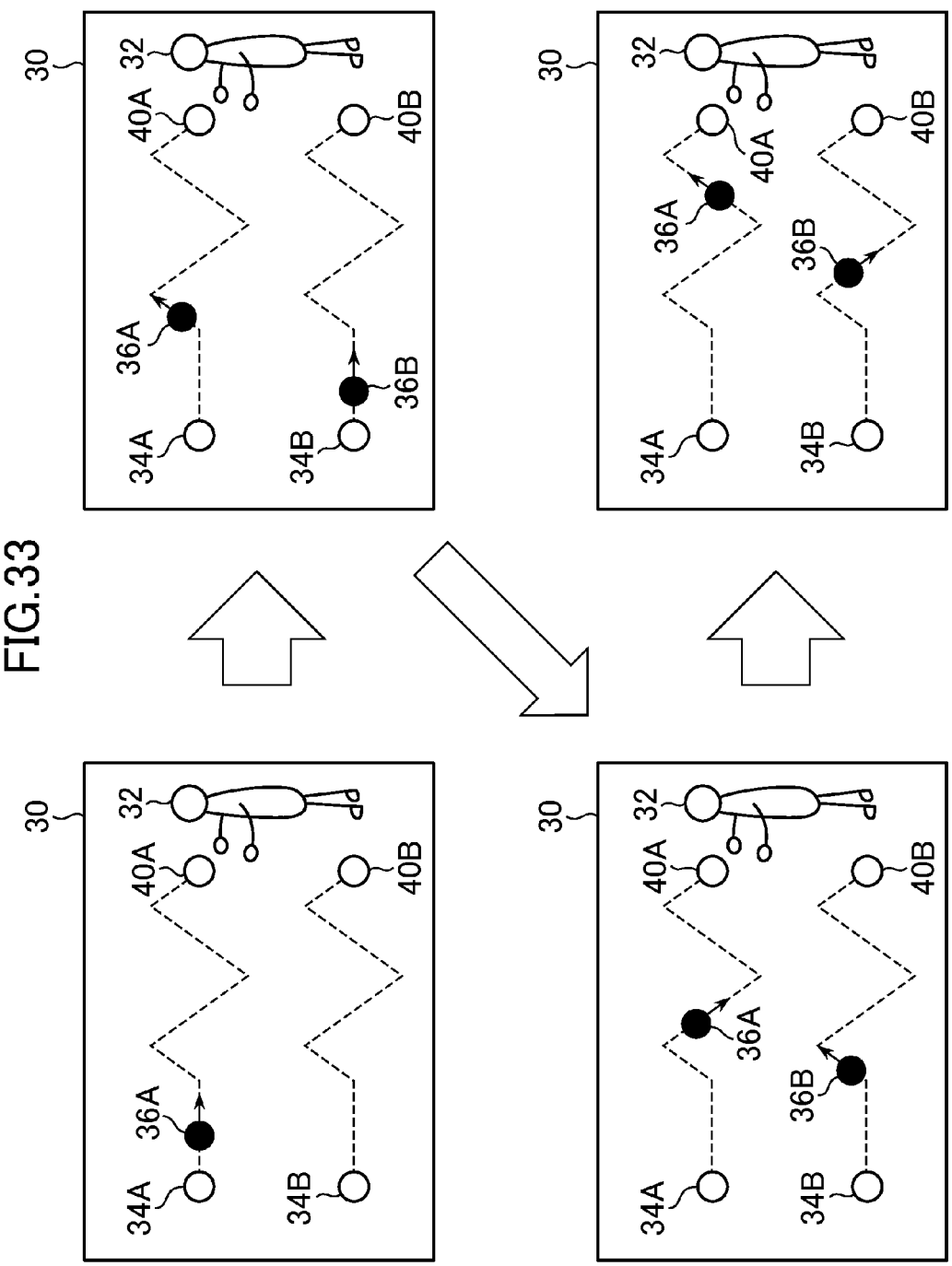

GAME DEVICE, CONTROL METHOD OF GAME DEVICE, PROGRAM, AND INFORMATION STORAGE MEDIUM

CROSS REFERENCE TO RELATED APPLICATIONS

This application is a National Stage of International Application No. PCT/JP2012/070611 filed Aug. 13, 2012, claiming priority based on Japanese Patent Application No. 2011-220749 filed on Oct. 5, 2011. The contents of each of the above documents are incorporated herein by reference in their entirety.

TECHNICAL FIELD

The present invention relates to a game device, a control method of a game device, a program, and an information storage medium.

BACKGROUND ART

Conventionally, there has been known a game in which a player performs a game operation to the music. In such a game, a guide image is shown on a game screen to indicate to a player a reference timing at which the player should perform a game operation.

For example, Patent Document 1 discloses a technique for showing a guide image near the center of a game screen when a reference timing is coming, and then gradually moving the guide image so as to approach a determination position in accordance with the interval between the reference timing and the current timing, to thereby indicate the reference timing to the player.

CITATION LIST

Patent Literature

[Patent Literature 1] JP 2001-70639 A

SUMMARY OF INVENTION

Technical Problem

However, in a case in which a guide image moves in one direction toward the determination position to indicate the reference timing, as described in Patent Document 1, a player cannot satisfactorily perceive the rhythm of music, based on the movement of the guide image, and resultantly cannot well recognize the reference timing.

The present invention has been conceived in view of the above, and an object thereof is to provide a game device, a control method of a game device, a program, and an information storage medium for enabling a user to more readily perceive the rhythm of music when playing a game in which the player performs a game operation to the music.

Solution to Problem

In order to solve the above-mentioned problem, a game device according to one embodiment of the present invention is a game device for executing a game in which a player performs a game operation to music, comprising: means for obtaining reference timing data indicating a reference timing at which the player should perform the game operation from means for storing the reference timing data; guide means for indicating the reference timing to the player by moving a guide image on a game screen from a generation position to a target position while changing a direction of the guide image in accordance with a beat of the music based on the reference timing data; game operation detection means for detecting the game operation by the player; and evaluation means for evaluating the game operation by the player, based on an operation timing at which the player performs the game operation and the reference timing indicated by the reference timing data.

Further, a control method for a game device according to one embodiment of the present invention is a control method for a game device for executing a game in which a player performs a game operation to music, comprising: a step of obtaining reference timing data indicating a reference timing at which the player should perform the game operation from means for storing the reference timing data; a guide step of indicating the reference timing to the player by moving a guide image on a game screen from a generation position to a target position while changing a direction of the guide image in accordance with a beat of the music based on the reference timing data; a game operation detecting step of detecting the game operation performed by the player; and an evaluation step of evaluating the game operation by the player, based on an operation timing at which the player performs the game operation and the reference timing indicated by the reference timing data.

Further, a program according to one embodiment of the present invention is a program for causing a computer to function as a game device, for executing a game in which a player performs a game operation to music, the program for causing the computer to function as: means for obtaining reference timing data indicating a reference timing at which the player should perform the game operation from means for storing the reference timing data; guide means for indicating the reference timing to the player by moving a guide image on a game screen from a generation position to a target position while changing a direction of the guide image in accordance with a beat of the music based on the reference timing data; game operation detection means for detecting the game operation performed by the player; and evaluation means for evaluating the game operation by the player based on an operation timing at which the game operation is performed by the player and the reference timing indicated by the reference timing data.

Further, an information storage medium according to one embodiment of the present invention is a computer-readable information storage medium having the above-mentioned program recorded thereon.

According to one embodiment of the present invention, it is possible to allow the player to feel the rhythm of the music with ease in the game configured so that the player performs the game operation in tune with the music.

Further, in an aspect of the present invention, the guide means indicates the reference timing to the player by moving the guide image from the generation position to the target position while changing the direction of the guide image at a timing defined in accordance with the beat of the music based on the reference timing data.

Further, in an aspect of the present invention, the game comprises a game configured in which the player performs the game operation to the music in a meter of n beats (n: natural number); and the guide means indicates the reference timing to the player by causing the guide image to occur in the generation position at a timing which is earlier than the reference timing by a given time and then moves the guide image to the target position while changing the direction of the guide image every time a timing which is earlier than the reference timing by k/n (k: natural number) of a bar arrives based on the reference timing data.

Further, in an aspect of the present invention, the guide means indicates the reference timing to the player by causing the guide image to occur in the generation position at a timing which is earlier than the reference timing by m bars (m: natural number) or at a timing prior to the timing, then causing the guide image to make a first direction change at a timing which is earlier than the reference timing by "m−1/n" bars, and then moving the guide image to the target position while changing the direction of the guide image every time the timing which is earlier than the reference timing by k/n (k: k<m*n−1) of a bar arrives, based on the reference timing data.

Further, in an aspect of the present invention, the guide means displays an image in the generation position or the target position, and changes the image in a case where the guide image occurs or in a case where the guide image changes the direction.

Further, in an aspect of the present invention, the guide means changes the guide image in a case where the guide image changes the direction.

Further, in an aspect of the present invention, the game device further comprising means for moving, on the game screen, a dummy guide image from the generation position to any one of direction change positions, in which the guide image changes the direction, on the same path as a path of the guide image and then moving the dummy guide image without changing the direction of the dummy guide image at the one of the direction change positions.

Further, in an aspect of the present invention, the guide means comprises: first guide means for indicating the reference timing to the player by moving, on the game screen, the guide image from the generation position to the target position based on the reference timing data while changing the direction of the guide image in accordance with the beat of the music; and second guide means for indicating the reference timing to the player by moving, on the game screen, the guide image from the generation position to the target position based on the reference timing data while changing the direction of the guide image in accordance with a beat different from the beat of the music.

Further, in an aspect of the present invention, the guide means comprises switching means for indicating the reference timing to the player between the first guide means and the second guide means based on a game result of the player.

Further, in an aspect of the present invention, the game operation detection means comprises means for detecting an operation amount of the game operation; and the guide means comprises means for changing at least one of: a moving distance and a moving speed of the guide image from the generation position up to a first direction change position; the moving distance and the moving speed of the guide image from a direction change position up to a subsequent direction change position; and the moving distance and the moving speed of the guide image from a last direction change position up to the target position, based on the operation amount of the game operation in a case where an evaluation of the game operation is performed.

Further, in an aspect of the present invention, the guide means comprises: means for determining whether or not the game operation has been performed in a case where the guide image changes the direction; and means for changing the generation position and the target position based on a position in which the direction is changed in a case where it is determined that the game operation has been performed in the case where the guide image changes the direction; and wherein the guide means is configured to cause the guide image, for indicating the reference timing arriving after the game operation is performed, to occur in the changed generation position and to move toward the changed target position while changing the direction in accordance with the beat of the music.

Further, in an aspect of the present invention, the game operation detection means detects a first kind of game operation and a second kind of game operation; the reference timing data indicates a first reference timing at which the first kind of game operation should be performed and a second reference timing at which the second kind of game operation should be performed; the guide means comprises: means for indicating the first reference timing to the player by moving, on the game screen, a first guide image from a first generation position to a first target position while changing the direction of the first guide image in accordance with the beat of the music; and means for indicating the second reference timing to the player by moving, on the game screen, a second guide image from a second generation position to a second target position while changing the direction of the second guide image in accordance with the beat of the music; and the game device further comprises: means for changing the first reference timing arriving subsequent to a current time point based on the second reference timing during execution of the game; and means for indicating to the player that the first reference timing has been changed by moving an image from the second generation position to the first generation position, or moving the image from the second target position to the first target position, on the game screen in a case where the first reference timing is changed.

BRIEF DESCRIPTION OF DRAWINGS

FIG. 5 shows an example of player position information generated by a position detecting device.

FIG. 7 shows an example of a game screen.

FIG. 8 shows a hardware configuration of the position detecting device.

FIG. 9 shows a hardware configuration of a game device.

FIG. 23 shows a game screen displayed according to Modified Example (2).

FIG. 29 shows a relation between a condition relating to a situation of the game being executed and a method of changing a reference timing.

FIG. 31 shows a screen transition of the game screen in a case where the reference timing is replaced.

FIG. 32 shows how the timing indicator mark moves in a case where the generation position is different from the target position.

FIG. 33 shows an example of the game screen according to Modified Example (10).

DESCRIPTION OF EMBODIMENT

[1. Embodiment]

Now, detailed description is given of an example of an embodiment of the present invention with reference to the drawings. A game device according to the embodiment of the present invention is implemented by, for example, a consumer game machine (stationary game machine), a portable game machine, a mobile phone (smartphone), a personal digital assistant (PDA), or a personal computer. In this specification, description is given of a case where the game device according to the embodiment of the present invention is implemented by a consumer game machine.

Figure 1:
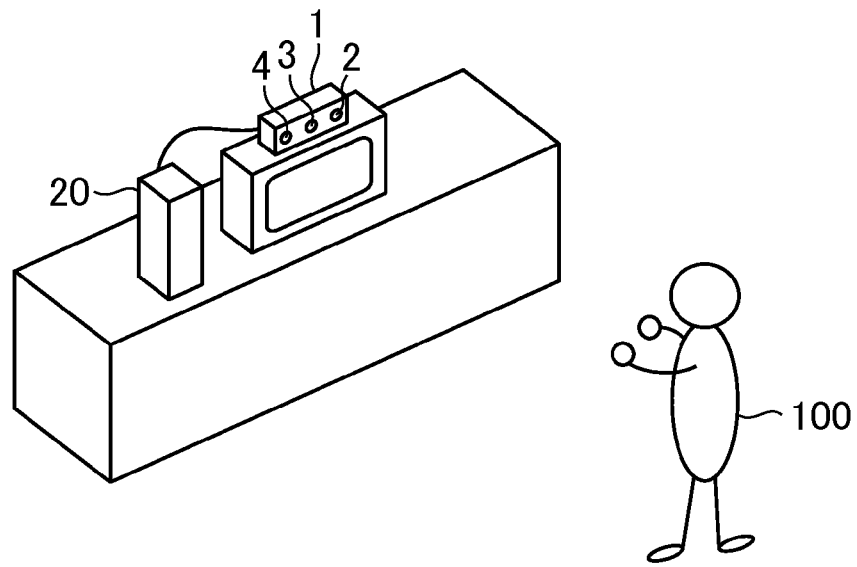
FIG. 1 shows how a player plays a game.

FIG. 1 shows how a player plays a game. As shown in FIG. 1, a player 100 is positioned, for example, in front of a position detecting device 1. The position detecting device 1 and a game device 20 are connected to each other so as to be able to communicate data therebetween.

[2. Operation of Position Detecting Device]

First, the position detecting device 1 is described. The position detecting device 1 generates player position information relating to a position of the player in a three-dimensional space. In this embodiment, description is given of a case where position information on the player includes information relating to positions of a plurality of body parts of the player 100. The body parts of the player 100 include, for example, a head and both arms.

As shown in FIG. 1, the position detecting device 1 includes, for example, a CCD camera 2, an infrared sensor 3, and a microphone array 4 including a plurality of microphones.

The CCD camera 2 is a known camera including a CCD image sensor. For example, the CCD camera 2 generates a photographed image (for example, RGB digital image) by photographing the player 100 at predetermined time intervals (for example, every 1/60th of a second).

Figure 2:
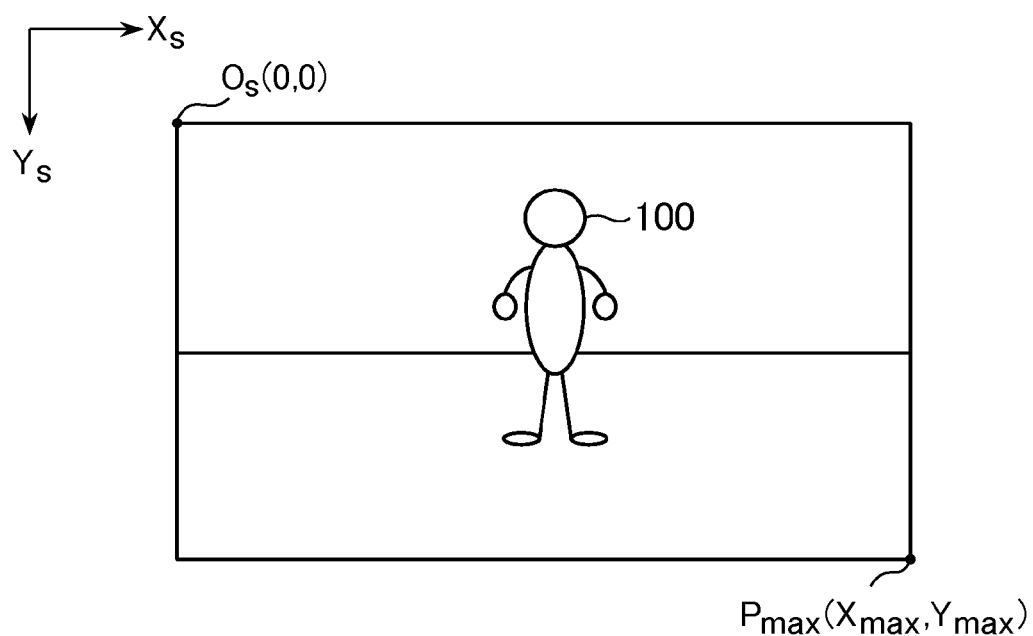
FIG. 2 shows an example of a photographed image generated by a CCD camera.

FIG. 2 shows an example of the photographed image generated by the CCD camera 2. As shown in FIG. 2, the photographed image includes, for example, the player 100. In the photographed image, there are set an Xs-axis and a Ys-axis, which are orthogonal to each other. For example, the upper left corner of the photographed image is set as an origin Os (0, 0). Further, for example, the lower right corner of the photographed image is set as coordinates Pmax (Xmax, Ymax). The position of each pixel in the photographed image is identified by two-dimensional coordinates (Xs-Ys coordinates) that are assigned to each pixel.

The infrared sensor 3 is formed of, for example, an infrared emitting device and an infrared receiving device (for example, infrared diodes). The infrared sensor 3 detects reflected light obtained by emitting infrared light. The infrared sensor 3 measures the depth of a subject (for example, player 100) based on a detection result of the reflected light.

The depth of a subject is a distance between a measurement reference position and the position of the subject. The measurement reference position is a position that serves as a reference in measuring the depth (perspective) of the position of the player 100. The measurement reference position may be a predetermined position associated with the position of the position detecting device 1, such as the position of the infrared receiving device of the infrared sensor 3. The infrared sensor 3 measures the depth of the player 100 based, for example, on a time of flight (TOF), which is a time required for the infrared sensor 3 to receive reflected light after emitting infrared light.

Figure 3:
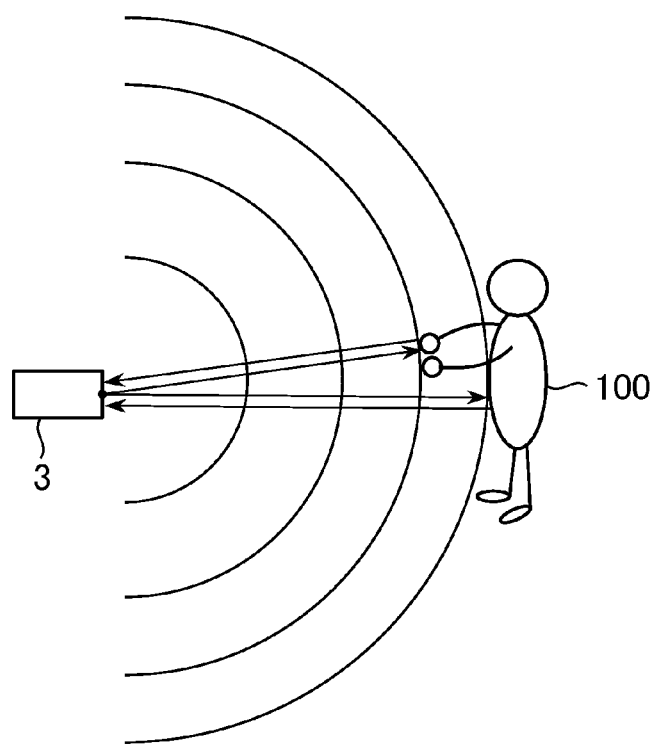
FIG. 3 explains a method of measuring a depth of the player, which is performed by an infrared sensor.

FIG. 3 explains a method of measuring the depth of the player 100, which is performed by the infrared sensor 3. As shown in FIG. 3, the infrared sensor 3 emits pulsed infrared light at predetermined intervals. The infrared light emitted from the infrared sensor 3 spreads spherically with an emission position of the infrared sensor 3 at the center.

The infrared light emitted from the infrared sensor 3 strikes, for example, a surface of the body of the player 100. The infrared light that has struck the surface is reflected. The reflected infrared light is detected by the infrared receiving device of the infrared sensor 3. Specifically, the infrared sensor 3 detects reflected light having a phase shifted by 180° from that of the emitted infrared light.

For example, as shown in FIG. 3, in a case where the player 100 is holding out both hands forward, those held-out hands are closer to the infrared sensor 3 than the torso of the player 100. Specifically, the TOF of the infrared light reflected by both hands of the player 100 is shorter than the TOF of the infrared light reflected by the torso of the player 100.

The value determined as follows corresponds to the distance between the measurement reference position and the player 100 (that is, depth). Specifically, the value is determined by multiplying a time required for the infrared sensor 3 to detect the reflected light after emitting the infrared light (that is, TOF) by the speed of the infrared light and then dividing the resultant value by two. In this manner, the infrared sensor 3 can measure the depth of the player 100.

Further, the infrared sensor 3 also detects an outline of a subject (player 100) by detecting depth differences acquired from the reflected infrared light. The fact that the infrared sensor 3 receives the reflected infrared light as described above means that an object is located at that place. Further, when there is no other object located behind the object in vicinity, the depth difference between the object and the surroundings of the object is large. For example, the infrared sensor 3 detects the outline of the player 100 by joining portions having the depth differences larger than a predetermined value.

Note that, the method of detecting the outline of the player 100 is not limited to the above-mentioned example. Alternatively, for example, the outline may be detected based on the brightness of each pixel of the photographed image acquired by the CCD camera 2. In this case, it is equally possible to detect the outline of the player 100 by, for example, joining portions having large brightness differences among the pixels.

Information relating to the depth of the player 100 (depth information), which is detected as described above, is expressed as, for example, a depth image. In this embodiment, description is given by taking, as an example, a case where the depth information is expressed as a gray-scale depth image (for example, 256-bit gray-scale image data).

Figure 4:
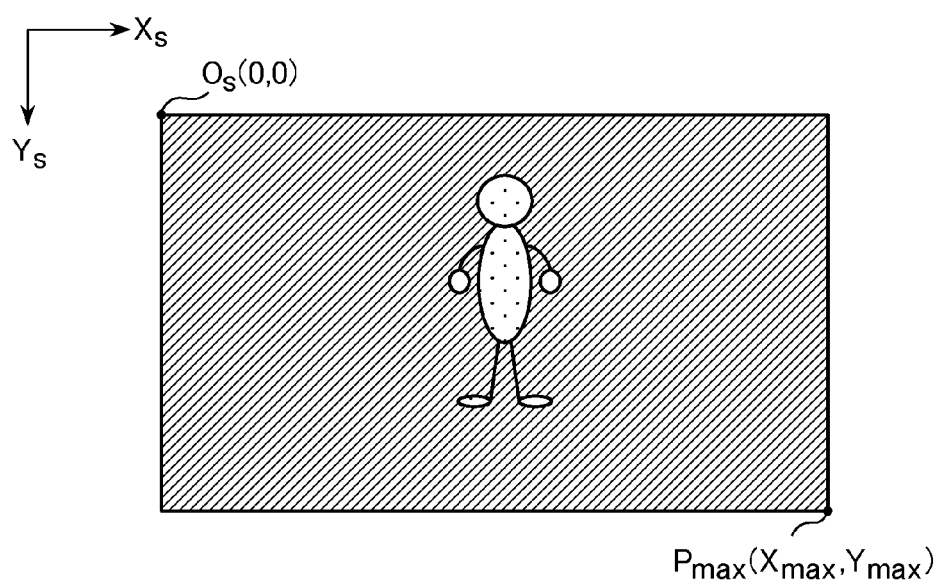
FIG. 4 shows an example of a depth image acquired by the infrared sensor.

FIG. 4 shows an example of the depth image acquired by the infrared sensor 3. As shown in FIG. 4, for example, an object located close to the infrared sensor 3 is expressed as bright (brightness is high), and an object located far from the infrared sensor 3 is expressed as dark (brightness is low). The depth of the player 100 corresponds to the brightness (pixel value) of the depth image.

For example, in a case where the depth image is expressed as the 256-bit gray-scale image data, for every 2-cm change in depth of the player 100, the depth image is changed in brightness by one bit. This case means that the infrared sensor 3 is capable of detecting the depth of the subject in units of 2 cm. In the case where the player 100 is holding out both hands forward (FIG. 3), as shown in FIG. 4, pixels corresponding to both hands of the player 100 are expressed as brighter (brightness is higher) than pixels corresponding to the torso.

In this embodiment, similarly to the CCD camera 2, the infrared sensor 3 generates the depth image at predetermined time intervals (for example, every 1/60th of a second). Based on the photographed image acquired by the CCD camera 2 and the depth image acquired by the infrared sensor 3, the player position information is generated relating to the positions of body parts of the player 100.

For example, there is generated such a composite image (RGBD data) that is obtained by adding the depth information (Depth) indicated by the depth image to the photographed image (RGB data) acquired by the CCD camera 2. In other words, the composite image contains, for each pixel, color information (lightness of each of R, G, and B) and the depth information.

When player position information is generated based on the composite image, first, based on the depth image, pixels corresponding to the outline of the player 100 are identified. Next, in the composite image, the color information (lightness of R, G, and B) of pixels enclosed within the outline is referred to. Based on the color information of the composite image, pixels corresponding to each part of the body of the player 100 are identified. For this identification method, for example, a known method is applicable, such as a pattern matching method in which the object (that is, each part of the body of the player 100) is extracted from the image through a comparison with a comparison image (training image).

Based on the pixel values (RGBD values) of the pixels identified as described above, sets of the three-dimensional coordinates of the head, shoulders, etc. of the player 100 are calculated. For example, the three-dimensional coordinates are generated by carrying out predetermined matrix transformation processing on those pixel values. The matrix transformation processing is executed through, for example, a matrix operation similar to transformation processing performed in 3D graphics between two coordinate systems of a world coordinate system and a screen coordinate system. Specifically, the RGB value indicating the color information of the pixel and the D value indicating the perspective are substituted into a predetermined determinant, to thereby calculate the three-dimensional coordinate of the pixel.

Note that, for the method of calculating the three-dimensional coordinate that corresponds to a pixel based on the pixel value (RGBD value), a known method may be applied, and the calculation method is not limited to the above-mentioned example. Alternatively, for example, the coordinate transformation may be performed using a lookup table.

FIG. 5 shows an example of the player position information generated by the position detecting device 1. As shown in FIG. 5, the player position information includes a plurality of pieces of information relating to positions of a plurality of body parts of the player 100. As the player position information, for example, each part of the player 100 and the three-dimensional coordinates are stored in association with each other.

Figure 6:
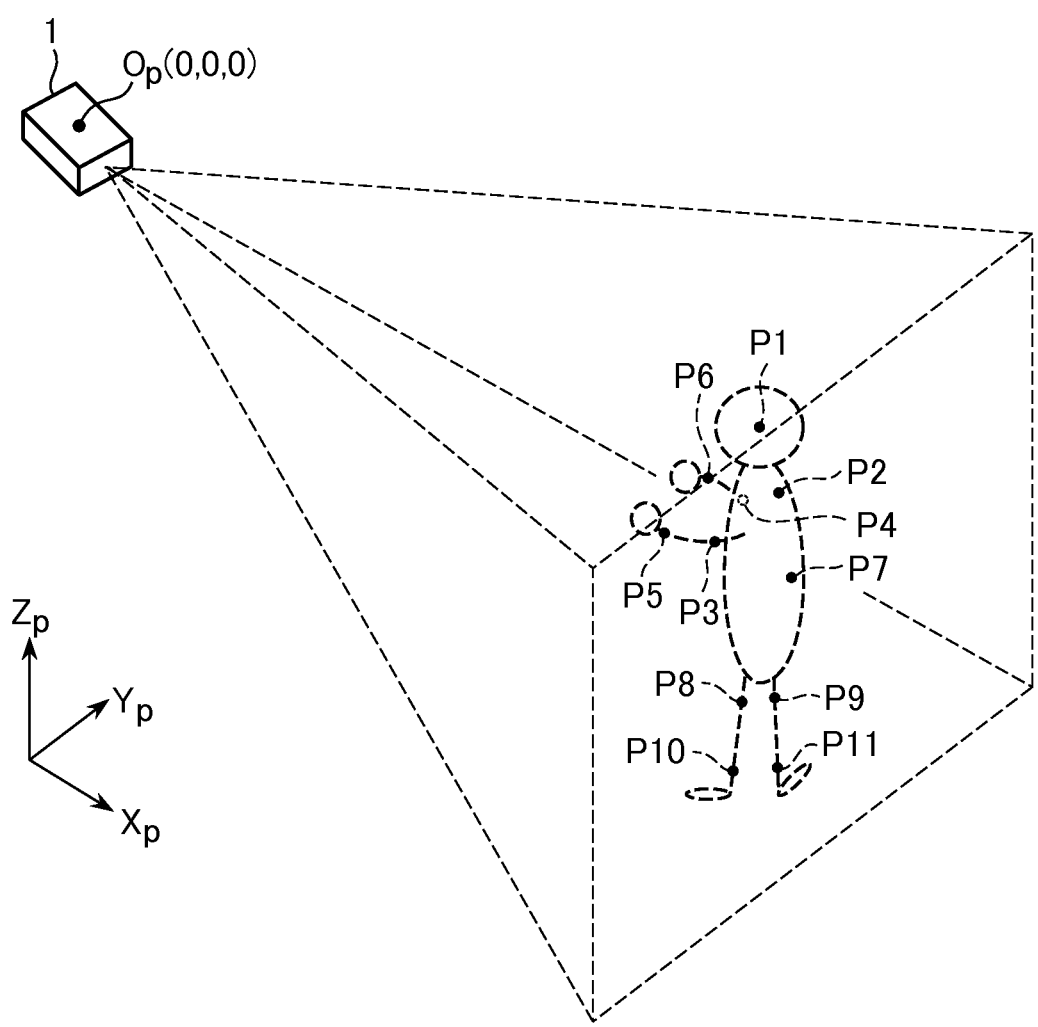
FIG. 6 shows a position of the player, which is identified by the player position information.

FIG. 6 shows the position of the player 100, which is identified by the player position information. In this embodiment, for example, a predetermined position corresponding to the position detecting device 1 (for example, the measurement reference position) is set as an origin Op. For example, the origin Op represents the three-dimensional coordinates corresponding to the measurement reference position of the infrared sensor 3. Note that, the position of the origin Op may be set anywhere in the three-dimensional space in which the player 100 exists. For example, the three-dimensional coordinates corresponding to the origin Os of the photographed image may be set as the origin Op.

As shown in FIG. 6, for example, the player position information includes eleven sets of three-dimensional coordinates corresponding to the head P1, shoulders P2, left upper arm P3, right upper arm P4, left lower arm P5, right lower arm P6, back P7, left thigh P8, right thigh P9, left shin P10, and right shin P11 of the player 100.

Note that, the part of the body of the player 100, which is indicated by the player position information, may be a part that is determined in advance from the player's body (skeletal frame).

For example, any part of the body may be used as long as the part is identifiable by the above-mentioned pattern matching method.

For example, the player position information generated every predetermined time intervals (for example, every 1/60th of a second) is transmitted from the position detecting device 1 to the game device 20. The game device 20 executes the game by receiving the player position information from the position detecting device 1 and grasping the movement of the body of the player (hereinafter reference numeral "100" of the player is omitted).

[3. Game Executed on Game Device]

The game device 20 executes a game in which a player performs a game operation to music. In this game, for example, the player projected on the photographed image acquired from the position detecting device 1 is displayed on a game screen.

FIG. 7 shows an example of the game screen. As shown in FIG. 7, a player image 32 formed by photographing the player and a plurality of generation position marks 34 arranged around the player image 32 are displayed on the game screen 30. Here, the game is played in a state in which the player image 32 displayed on the game screen 30 and the player face each other, and hence the player image 32 is an image obtained by extracting the outline of the player from the photographed image and subjecting the outline to horizontal reverse processing.

Because the player image 32 is displayed based on the photographed image, when the player moves his/her body, the display of the player image 32 is also updated in synchronization of this motion. For example, when the player raises his/her right hand, the display of the player image 32 is updated so that his/her hand on the right side rises when viewed from the player within a real space.

There are, for example, eight generation position marks 34 (generation position marks 34A to 34H) arranged in a circular shape so as to surround the player image 32. A display position of the generation position mark 34 corresponds to a "generation position" and a "target position" according to the present invention. In other words, a plurality of generation positions and a plurality of target positions are set for the game screen 30. Here, the plurality of generation positions and the plurality of target positions are set around a reference position (display position of the player image 32).

A timing indicator mark 36 is displayed near the generation position mark 34. The timing indicator mark 36 occurs in the generation position mark 34 when a reference timing is approaching. Then, as shown in FIG. 7, the timing indicator mark 36 moves upward from the generation position mark 34 with a lapse of time, and then changes its direction rightward. The position at which the direction is changed corresponds to a "direction change position" according to the present invention.

After that, the timing indicator mark 36 moves rightward by a predetermined distance, and then changes the direction downward. In addition, the timing indicator mark 36 moves downward by a predetermined distance, and then changes the direction leftward to return to the generation position mark 34. When the reference timing arrives, the timing indicator mark 36 coincides with the generation position mark 34.

In this embodiment, the number of times that the timing indicator mark 36 changes the direction and timings are defined based on a beat of the music. For example, in a case where the music has a four-beat rhythm, as shown in FIG. 7, the timing indicator mark 36 changes the direction three times. In the four-beat rhythm, the timing indicator mark 36 occurs at a timing at which the first beat is played, and the direction is changed at timings at which the other three beats are played.

An excellent evaluation is given to the player when the player actually moves his/her body so that the player displayed in the player image 32 touches the generation position mark 34 at a timing at which the timing indicator mark 36 coincides with the generation position mark 34. In other words, in this embodiment, an operation in which the player actually moves his/her body so that the player displayed in the player image 32 touches the generation position mark 34 corresponds to the "game operation".

In this manner, on the game device 20, when the reference timing at which the player should perform the game operation is approaching, the timing indicator mark 36 occurs in the generation position mark 34, and moves while changing the direction in accordance with the beat of the music, to return to the generation position mark 34. For example, compared to a case where the timing indicator mark 36 moves in one direction, the player feels the rhythm of the music with ease owing to the motion of the timing indicator mark 36 that appears to keep the beat of the music. As a result, the player grasps the reference timing with ease. In the following, this technology is described in detail.

First, detailed description is given of hardware configurations of the position detecting device 1 and the game device 20.

[4. Configuration of Position Detecting Device]

FIG. 8 shows a hardware configuration of the position detecting device 1. As shown in FIG. 8, the position detecting device 1 includes a control unit 10, a storage unit 11, a photographing unit 12, a depth measuring unit 13, an audio input unit 14, and a communication interface unit 15. The respective components of the position detecting device 1 are connected to one another by a bus 16 so as to be able to exchange data thereamong.

The control unit 10 controls the respective units of the position detecting device 1 in accordance with an operating system and various kinds of programs which are stored in the storage unit 11.

The storage unit 11 stores programs and various kinds of parameters which are used for operating the operating system, the photographing unit 12, and the depth measuring unit 13. Further, the storage unit 11 stores a program for generating the player position information based on the photographed image and the depth image.

The photographing unit 12 includes the CCD camera 2 and the like. The photographing unit 12 generates, for example, the photographed image of the player. The depth measuring unit 13 includes the infrared sensor 3 and the like. The depth measuring unit 13 generates the depth image based, for example, on the TOF acquired by the infrared sensor 3. As described above, the control unit 10 generates the player position information based on the photographed image generated by the photographing unit 12 and the depth image generated by the depth measuring unit 13 at predetermined time intervals (for example, every $\frac{1}{60}$th of a second).

The audio input unit 14 includes, for example, the microphone array 4. The communication interface unit 15 is an interface for transmitting various kinds of data, such as the player position information, to the game device 20.

[5. Configuration of Game Device]

FIG. 9 shows a hardware configuration of the game device 20. As shown in FIG. 9, the game device 20 includes a control unit 21, a main storage unit 22, an auxiliary storage unit 23, an optical disc reproducing unit 24, a communication interface unit 25, an operation unit 26, a display unit 27, and an audio output unit 28. The respective components of the game device 20 are connected to one another by a bus 29.

The control unit 21 includes, for example, a CPU, a graphics processing unit (GPU), and a sound processing unit (SPU). The control unit 21 executes various kinds of processing in accordance with to an operating system and other programs.

The main storage unit 22 includes, for example, a random access memory (RAM). The auxiliary storage unit 23 includes, for example, a hard disk drive (information storage medium). The main storage unit 22 stores programs and data read from the auxiliary storage unit 23 or an optical disc (information storage medium). Further, the main storage unit 22 is also used as a work memory for storing data to be required in the course of the processing. Further, for example, the main storage unit 22 temporarily stores the player position information received from the position detecting device 1 in association with a reception time.

The optical disc reproducing unit 24 reads programs and data stored on the optical disc. For example, a game program is stored on the optical disc.

The communication interface unit 25 is an interface for communicatively connecting the game device 20 to a communication network. The game device 20 acquires the player position information from the position detecting device 1 via the communication interface unit 25.

The operation unit 26 is used by the player to perform various operations. The operation unit 26 includes, for example, a game controller, a touch panel, a mouse, or a keyboard. The display unit 27 is, for example, a consumer television set or a liquid crystal display panel. The display unit 27 displays a screen in accordance with an instruction from the control unit 21. The audio output unit 28 includes, for example, a speaker or headphones.

In this embodiment, description is given of a case where the programs and data necessary to execute the game are supplied to the game device 20 via the optical disc. Note that, those programs and data may be supplied to the game device 20 via another information storage medium (for example, memory card). Alternatively, the programs and data may be supplied from a remote site to the game device 20 via the communication network.

[6. Functions Implemented on Game Device]

Figure 10:
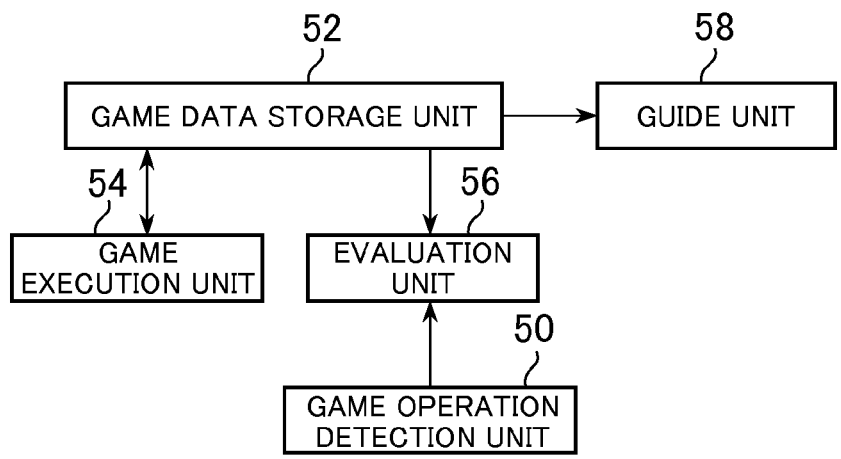
FIG. 10 is a functional block diagram showing functions implemented on the game device.

FIG. 10 is a functional block diagram illustrating functions implemented on the game device 20. As shown in FIG. 10, on the game device 20, there are implemented a game operation detection unit 50, a game data storage unit 52, a game execution unit 54, an evaluation unit 56, and a guide unit 58. Those functions are implemented by the control unit 21 operating in accordance with programs read from the optical disc.

[6-1. Game Operation Detection Unit]

The game operation detection unit 50 is mainly implemented by the control unit 21. The game operation detection unit 50 detects the game operation performed by the player. Here, description is given of a case where the game operation detection unit 50 detects w kinds (w is a natural number) of game operations. For example, the game operation detection unit 50 detects the game operation of the player by determining whether or not the position of each body part of the player indicated by the player position information is within a predetermined area range.

Figure 11:
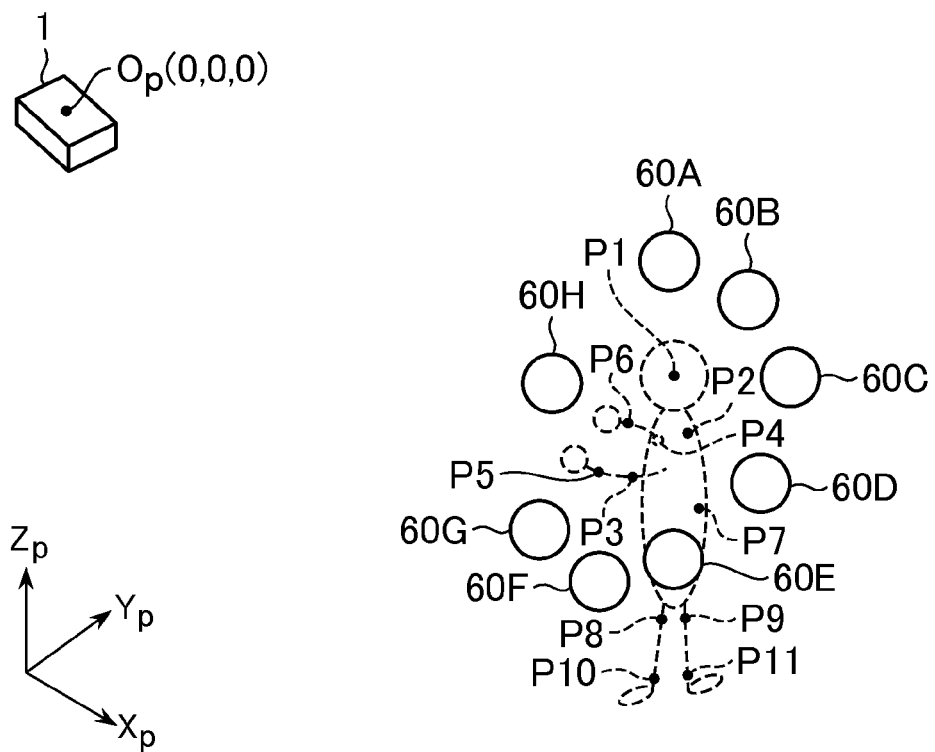
FIG. 11 explains a detection method for a game operation.

FIG. 11 explains a detection method for the game operation. As shown in FIG. 11, for example, a determination area 60 for determining whether or not the game operation has been performed is set in the three-dimensional coordinate space indicated by the player position information. Here, the three-dimensional coordinate space represents a coordinate system indicating the real space, and is used to indicate the position of each body part of the player in the real space. In this embodiment, the determination areas 60 the number of which is the same as the number (for example, eight) of the generation position marks 34 are set. For example, a determination area 60A corresponds to the generation position mark 34A. In the same manner, determination areas 60B to 60H correspond to the generation position marks 34B to 34H, respectively.

For example, the position of the determination area 60 set in the three-dimensional space is decided based on the position of the generation position mark 34. For example, the determination area 60 is set so that a positional relation between the position of the player indicated by the player position information and the position of the determination area 60 corresponds to the positional relation within the game screen 30 between the position of the player image 32 and the position of the generation position mark 34. For example, in the case where the generation position marks 34 are set around the player image 32 as shown in FIG. 7, the determination areas 60 are set around the back P7 of the player as shown in FIG. 11.

A size of the determination area 60 may be set to a size defined in advance, or may be decided based on, for example, the size of the generation position mark 34. As shown in FIG. 11, for example, the determination area 60 may be a sphere having a predetermined radius.

The game operation performed by the player is detected by determining whether or not the set of the three-dimensional coordinates of each body part of the player indicated by the player position information is within the determination area 60. In other words, in the case where the set of the three-dimensional coordinates of the body part of the player indicated by the player position information is within the determination area 60, it is determined that the game operation has been performed by the player.

In this embodiment, eight kinds of game operations (first game operation to eighth game operation) corresponding to the eight determination areas 60A to 60H are detected. The game operation detection unit 50 determines which kind of game operation has been performed by determining whether or not which of the determination areas 60A to 60H the body part of the player indicated by the player position information is in.

Note that, the information indicating the position and the size of the determination area 60 set in the three-dimensional coordinate space is stored in the game data storage unit 52 described later. In addition, the player position information acquired from the position detecting device 1 is stored in the game data storage unit 52 in chronological order. Further, with regard to the game operation, touching the determination area 60 for a fixed time may correspond to the "game operation".

[6-2. Game Data Storage Unit]

The game data storage unit 52 is mainly implemented by the main storage unit 22 and the auxiliary unit 23. The game data storage unit 52 stores information necessary for executing the game. For example, the game data storage unit 52 stores the following data:

(1) music data;
(2) determination area data indicating the determination area 60 set in the three-dimensional space;
(3) data obtained by storing the player position information in chronological order; and
(4) game situation data indicating a situation (including score and elapsed time) of the game being executed.

Note that, among the above-mentioned pieces of data, the music data is data prepared in advance by a game creator. The determination area data is data generated when the game is executed. The player position information is data generated by the position detecting device 1. The game situation data is data generated and updated by a game program.

Figure 12:
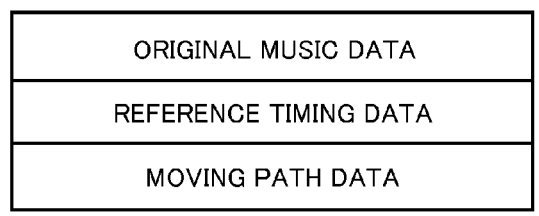
FIG. 12 shows a data storage example of music data.

FIG. 12 shows a data storage example of the music data. As shown in FIG. 12, the music data includes original music data, reference timing data, and moving path data.

[Original Music Data]

The original music data is data obtained by saving general popular music or the like in a predetermined data format. The music indicated by the original music data is a music in a meter of n beats (n is a natural number), and here, description is given of an exemplary case of using the music in a simple meter such as duple, triple, or quadruple meter. Note that, the meter of the music may be any meter that is used in a general music, and the meter may have any number of beats. In addition to the simple meter, the music in a complex meter (for example, sextuple meter), an irregular meter (for example, septuple meter), or the like may be used.

[Reference Timing Data]

The reference timing data is data indicating a reference timing at which the player should perform the game operation. The reference timing data is created in consideration of, for example, the beat (tempo/rhythm) of the music. Here, description is given of a case where the reference timing data indicates the reference timing at which the game operation should be performed with regard to each of the w kinds of game operations (for example, eight kinds of game operations).

Figure 13:
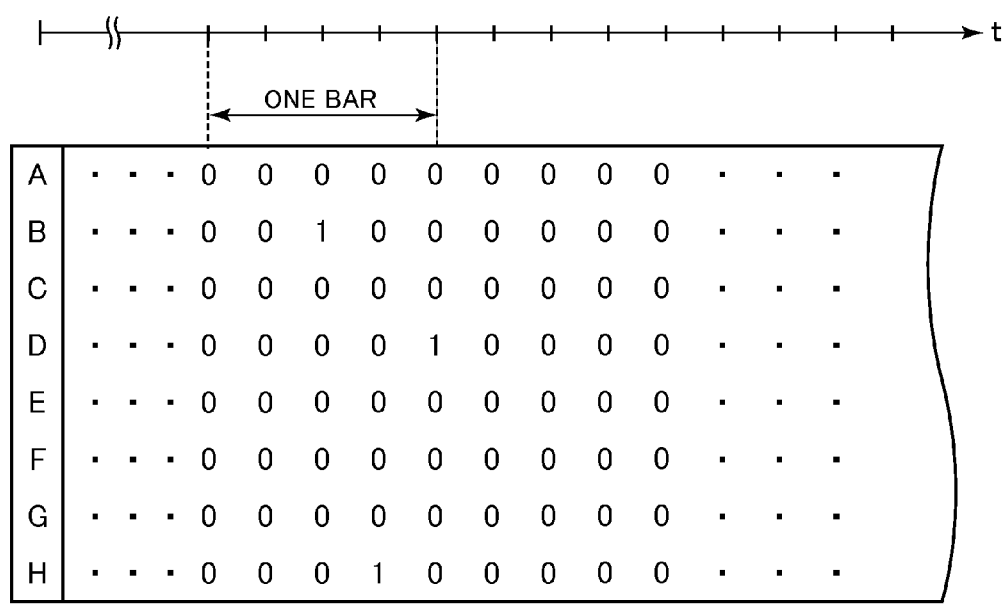
FIG. 13 shows an example of reference timing data.

FIG. 13 shows an example of the reference timing data. A t-axis illustrated in FIG. 13 represents a time axis. The t-axis indicates a lapse of time since reproduction of the music started. In this embodiment, the reference timing data indicates the timing at which the player should perform the game operation in units of ¼th of a bar. In other words, the reference timing data represents data obtained by dividing one bar into four. In other words, for each timing at which each 1/n of a bar obtained by dividing one bar into n starts, data of "0" or "1" indicating whether or not the each timing is the reference timing is set. Note that, the reference timing data is not limited thereto, and may indicate the reference timing in units of ¹/₂₅₆th of a bar.

As shown in FIG. 13, at each time point in ¼th of a bar, it is expressed by data of eight bits whether or not the player should perform the game operation. In other words, for each of the eight kinds of game operations, it is defined whether or not the game operation should be performed. In FIG. 13, bits "A" to "H" indicate whether or not the player should touch the determination areas 60A to 60H, respectively.

The bit "A" being "0" indicates that the player should not move his/her body in order to include the position of the body part of the player in the determination area 60A. On the other hand, the bit "A" being "1" indicates that the player should move his/her body in order to include the position of the body part of the player in the determination area 60A.

The same applies to the bits "B" to "H". Specifically, the bits "B" to "H" being "0" indicate that the player should not move his/her body in order to include the position of the body part of the player in the determination areas 60B to 60H, respectively. Further, the bits "B" to "H" being "1" indicate that the player should move his/her body in order to include the position of the body part of the player in the determination areas 60B to 60H, respectively.

In this manner, the reference timing data includes a w-th piece of reference timing data (for example, data on each of "A" to "H") indicating a w-th reference timing at which a w-th game operation (for example, w=8) should be performed. In other words, the timing at which at least one piece of the data of eight bits "A" to "H" is "1" is the reference timing, and the data in which at least one piece of the data of eight bits is "1" may be considered as the data indicating the reference timing.

[Moving Path Data]

The moving path data is data indicating a path along which the timing indicator mark 36 moves, and is data indicating a moving path corresponding to the beat of the music indicated by the original music data. The moving path data may be considered as data indicating, for example, a direction change timing at which the timing indicator mark 36 should change the direction and the position and the direction in which the direction should be changed. In other words, the moving path data is data that defines when and how the timing indicator mark 36 changes the direction. A plurality of moving paths are prepared by the game creator for each meter of the music, and the moving path data stores information indicating any one of the plurality of moving paths.

Figure 14:
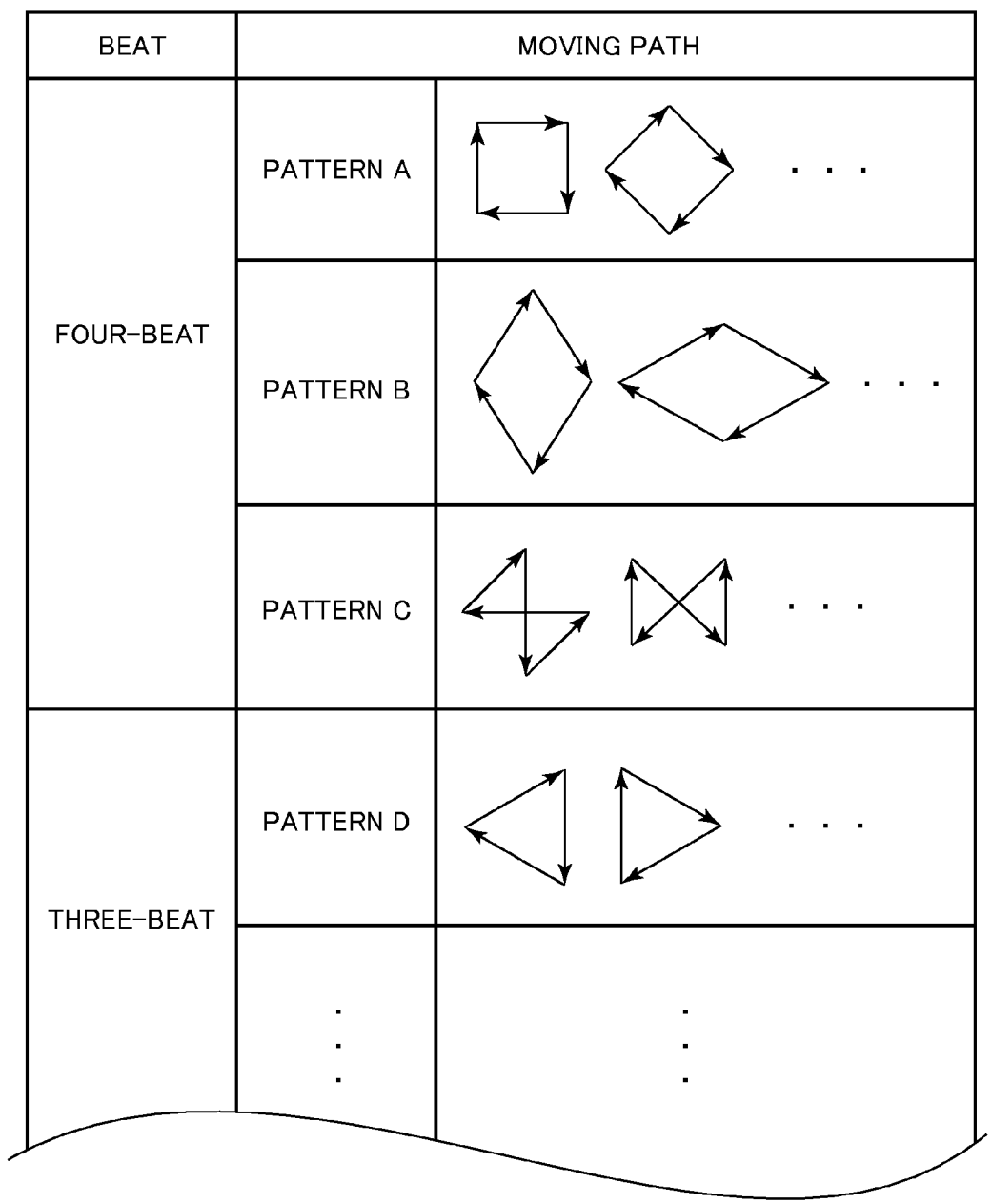
FIG. 14 shows a moving path used according to an embodiment of the present invention.

FIG. 14 shows the moving path used in this embodiment. As shown in FIG. 14, for each meter of the music, one or a plurality of patterns of the moving path are prepared. The data indicating association illustrated in FIG. 14 may be stored in the game data storage unit 52. As the moving path data, information indicating any one of the patterns illustrated in FIG. 14 is stored. For example, in a case of a four-beat music, the moving path of any one of patterns A to C illustrated in FIG. 14 is stored in the moving path data.

In the example illustrated in FIG. 14, in the "pattern A", the timing indicator mark 36 moves along the path of a square. In the "pattern B", the timing indicator mark 36 moves along the path of a rhombus. In the "pattern C", the timing indicator mark 36 moves along the path of a Z letter and then further moves to return to an original position. Further, in a "pattern D" associated with a three-beat music, the timing indicator mark 36 moves along the path of a triangle.

Each pattern stores not only the information indicating the moving path itself but also information indicating a moving speed of the timing indicator mark 36 and information indicating an initial moving direction of the timing indicator mark 36 (moving direction immediately after an occurrence thereof). Further, each pattern indicates the direction change timing at which the timing indicator mark 36 should change the direction and the position and the direction in which the direction should be changed. In the pattern associated with an n-beat music, the moving path is indicated so that the timing indicator mark 36 changes the direction (n−1) times during one bar, and the timing at which the direction is changed is defined based on the timing at which the beat is played in the meter of the music. The timing at which the beat is played in the meter represents a timing that arrives for each 1/n of a bar. In other words, each pattern may be considered also as information in which the positional relation between the generation position and the display position of the timing indicator mark 36 is stored in chronological order.

Note that, the data stored in the game data storage unit 52 is not limited to the above-mentioned example. The game data storage unit 52 may store various kinds of data for executing the game. Alternatively, for example, the image data on the generation position mark 34 and the timing indicator mark 36 may be stored. Further, the control unit 21 functions as means for acquiring the various kinds of data stored in the game data storage unit 52.

[6-3. Game Execution Unit]

The game execution unit 54 is mainly implemented by the control unit 21. The game execution unit 54 executes the game configured so that the player performs the game operation in tune with the music (music in the meter of n beats). For example, the game execution unit 54 executes the game by updating the game situation data based on an algorithm defined in the game program.

[6-4. Evaluation Unit]

The evaluation unit 56 is mainly implemented by the control unit 21. The evaluation unit 56 evaluates the game operation performed by the player based on an operation timing at which the game operation is performed by the player and the reference timing indicated by the reference timing data. For example, the evaluation unit 56 evaluates the game operation based on a lag between the reference timing indicated by the reference timing data and the operation timing at which the player actually performs the game operation. For example, as a timing difference between the reference timing and the operation timing becomes smaller, an evaluation of the game operation becomes higher.

In the case of this embodiment, for example, any one of "MARVELOUS", "PERFECT", "GREAT", "GOOD", "ALMOST", and "BOO" is decided as the evaluation based on the timing difference between the timing (reference timing) at which the timing indicator mark 36 that has left the generation position mark 34 returns to the generation position mark 34 and the timing (operation timing) at which the body part of the player indicated by the player position information actually comes into the determination area 60.

Figures 15, 16:
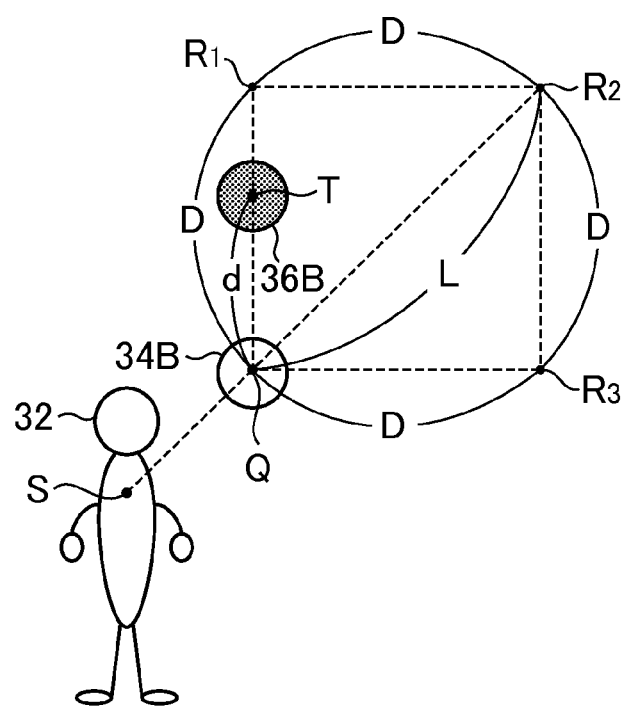
FIG. 15 shows a relation between a timing difference ($\Delta T$) and an evaluation.
FIG. 16 explains a method of moving a timing indicator mark.

FIG. 15 shows a relation between the timing difference ($\Delta T$) and the evaluation. Data indicating this relation may be stored in, for example, the game data storage unit 52. For example, the timing difference ($\Delta T$) assumes a negative value in a case where the operation timing is earlier than the reference timing. On the other hand, for example, the timing difference ($\Delta T$) assumes a positive value in a case where the operation timing is later than the reference timing. For example, the evaluation associated with the timing difference is given to the player.

As shown in FIG. 15, the evaluation of anyone of "MARVELOUS", "PERFECT", "GREAT", "GOOD", "ALMOST", and "BOO" is given in ascending order of the timing difference ($\Delta T$). Note that, those evaluations are listed as "MARVELOUS", "PERFECT", "GREAT", "GOOD", "ALMOST", and "BOO" in descending order thereof. In other words, "MARVELOUS" exhibiting the smallest timing difference ($\Delta T$) is the highest evaluation, while "BOO" exhibiting the largest timing difference ($\Delta T$) is the lowest evaluation.

[6-5. Guide Unit]

The guide unit 58 is mainly implemented by the control unit 21 and the display unit 27. The guide unit 58 indicates the player the reference timing by moving a guide image (for example, timing indicator mark 36) from the generation position to the target position on the game screen 30 while changing the direction in accordance with the beat of the music based on the reference timing data. The guide unit 58 moves the timing indicator mark 36 based on the moving path data. The timing indicator mark 36 occurs in the generation position on the game screen 30, and moves toward the target position on the game screen 30 while changing the direction at the direction change timing corresponding to the beat of the music.

The generation position is a position in which the timing indicator mark 36 appears when the reference timing is approaching, for example, the display position of the generation position mark 34. The target position is the position of a moving destination (destination point) of the timing indicator mark 36, and is a position in which the timing indicator mark 36 should be displayed in the case where the reference timing arrives.

The generation position may be any one of the same position as the target position and a different position therefrom. In this embodiment, the timing indicator mark 36 occurs in the generation position mark 34 to return to the generation position mark 34, and hence the display position of the generation position mark 34 serves both as the "generation position" and as the "target position".

Note that, in the embodiment, the generation position is the same as the target position, and hence the image (generation position mark 34) is displayed in the generation position and the target position, but the image for showing the user the target position may be displayed in the target position, while no image may be displayed in the generation position. Here, the image is displayed in the target position in order to allow the user to grasp the position of the guide image in the case where the reference timing arrives. In other words, the user grasps the reference timing based on the positional relation between the image displayed in the target position and the guide image. Further, in the case where the generation position is different from the target position, the image may be displayed only in the target position, while no image may be displayed in the generation position.

The direction change timing is a timing defined based on the beat of the music. Here, when the "beat" indicates each segment obtained by dividing one bar into n, the direction change timing is a start timing of the segment. Further, when the "beat" indicates a break position obtained by dividing one bar into n, the direction change timing is a timing in the break position.

In a case where the reference timing is included in a predetermined period after a current time point (for example, period from the current time point until the end of one bar; hereinafter referred to as "guide showing period"), the guide unit 58 causes the timing indicator mark 36 to occur in the generation position mark 34 on the game screen 30 and to move so as to return to the generation position mark 34 while changing the direction in accordance with the beat of the music based on a time difference between the current time point and the reference timing.

FIG. 16 explains a method of moving the timing indicator mark 36. Here, description is given of a case where the timing at which "B" of the reference timing data illustrated in FIG. 13 is "1" is approaching. In other words, description is given of an exemplary case where a timing indicator mark 36B occurs in the generation position mark 34B and moves while changing the direction. In addition, here, description is given of a case of using the music in the quadruple meter.

As shown in FIG. 16, the display position of the generation position mark 34B is set as a generation position Q. Further, direction change positions $R_1$, $R_2$, and $R_3$ that each satisfy a predetermined positional relation with the generation position Q are set on the game screen 30. The direction change positions $R_1$, $R_2$, and $R_3$ are positions in which the timing indicator mark 36B changes the direction.

Here, a position spaced apart from the generation position Q by a predetermined distance L in a direction extending from a display position S of the player image 32 toward the generation position Q is set as the direction change position $R_2$. Further, of the vertices of a square in which a line segment connecting between the generation position Q and the direction change position $R_2$ is set as a diagonal line thereof (square whose side has a length of a distance D as indicated by the dotted line), the points other than the generation position Q or the direction change position $R_2$ are set as the direction change positions $R_1$ and $R_3$. The timing indicator mark 36B moves along each side of this square. In other words, the moving path data represents information indicating each vertex of this square and information in which positions (positions on each side of the square) in which the timing indicator mark 36B should be displayed are stored in chronological order.

More specifically, for example, when the timing one bar before the reference timing at which "B" of the reference timing data illustrated in FIG. 13 is "1" arrives, the timing indicator mark 36B occurs in the generation position Q. Then, the timing indicator mark 36B moves from the generation position Q toward the direction change position $R_1$ so that a distance d between a display position T of the timing indicator mark 36B and the generation position Q becomes gradually large. In addition, when the timing 3/4ths of a bar before the reference timing at which "B" of the reference timing data is "1" arrives, the timing indicator mark 36B reaches the direction change position R.

When the timing indicator mark 36B reaches the direction change position $R_1$, the moving direction changes clockwise by 90°. Then, the timing indicator mark 36B moves from the direction change position $R_1$ toward the direction change position $R_2$ so that a distance between the display position T of the timing indicator mark 36B and the direction change position $R_1$ becomes gradually large. In addition, when the timing 2/4ths of a bar before the reference timing at which "B" of the reference timing data is "1" arrives, the timing indicator mark 36B reaches the direction change position $R_2$.

After that, in the same manner, the moving direction of the timing indicator mark 36B changes clockwise by 90°, and the timing indicator mark 36B moves from the direction change position $R_2$ toward the direction change position $R_3$. When the timing 1/4th of a bar before the reference timing at which "B" of the reference timing data is "1" arrives, the timing indicator mark 36B reaches the direction change position $R_3$. Then, the moving direction of the timing indicator mark 36B changes clockwise by 90°, and the timing indicator mark 36B moves from the direction change position $R_3$ toward the generation position Q. In the case where the reference timing at which "B" of the reference timing data is "1" arrives, the timing indicator mark 36B coincides with the generation position mark 34B.

In this manner, when the time point at which the data of "B" of the reference timing data is "1" is approaching, the timing indicator mark 36B occurs and moves while changing the direction in the order of the generation position Q→the direction change position $R_1$→the direction change position $R_2$→the direction change position $R_3$→the generation position Q. Note that, the moving speed of the timing indicator mark 36B may be constant, or may change during the movement.

The above description has been given of how the timing indicator mark 36B moves, but the same applies to the movement of other timing indicator marks 36A and 36C to 36H. In the above description, "B" can be read as any one of "A" and "C" to "H".

Figure 17:
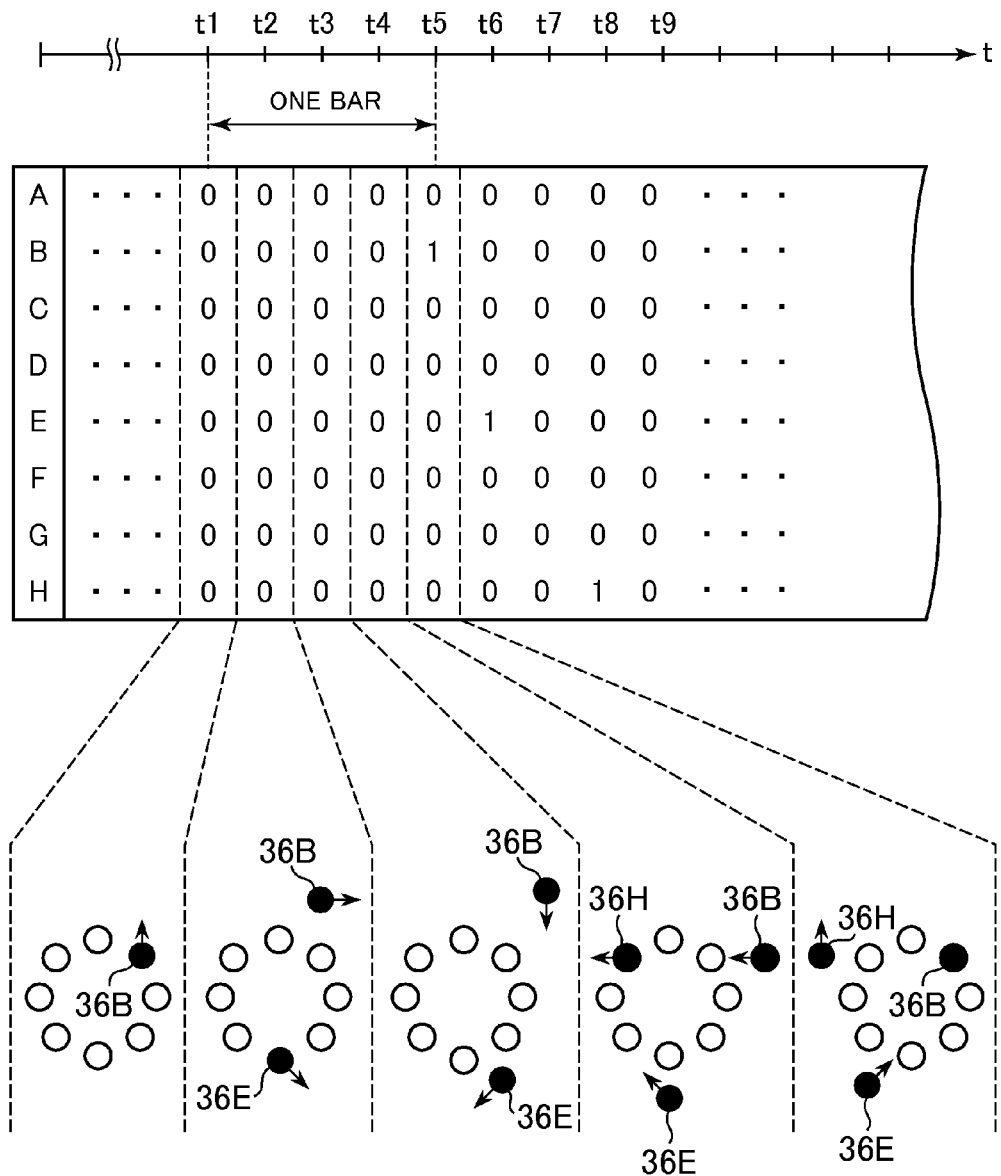
FIG. 17 explains in chronological order how the timing indicator mark moves.

FIG. 17 explains in chronological order how the timing indicator mark 36 moves. For example, while the music is being reproduced, data on the guide showing period (for example, period from the current time point until the end of one bar) is read from the reference timing data. Based on the read data, the timing indicator mark 36 for showing the reference timing within the guide showing period is displayed on the game screen 30.

As shown in FIG. 17, in a case where the current time point is a time t1, the data of "B" at a time t5 is "1" within the guide showing period (times t1 to t5), and hence the timing indicator mark 36B occurs in the generation position mark 34B.

In a case where the current time point is the time t2, data of "E" at a time t6 is "1" within the guide showing period (times t2 to t6), and hence the timing indicator mark 36E occurs in the generation position mark 34E. Further, the timing indicator mark 36B that has occurred at the time t1 reaches the direction change position to change the direction.

In a case where the current time point is the time t3, there is no new data being "1" within the guide showing period (times t3 to t7), and hence no new timing indicator mark 36 occurs. The timing indicator mark 36B and the timing indicator mark 36E reach the respective direction change positions and change the directions.

In a case where the current time point is the time t4, data of "H" at the time t8 is "1" within the guide showing period (times t4 to t8), and hence the timing indicator mark 36H occurs in the generation position mark 34H. The timing indicator mark 36B and the timing indicator mark 36E reach the respective direction change positions and change the directions.

In a case where the current time point is the time t5, there is no new data being "1" within the guide showing period (times t5 to t9), and hence no new timing indicator mark 36 occurs. Further, the data of "B" at the time t5 is "1" and the reference timing at which the player should touch the determination area 60B arrives, and hence the timing indicator mark 36B reaches the generation position mark 34B. Note that, in a case where, prior thereto, the player performs the game operation and the evaluation is performed, the timing indicator mark 36B may be erased. Further, the timing indicator mark 36E and the timing indicator mark 36H reach the respective direction change positions and change the directions.

At the subsequent times, the same display control is performed. In this manner, when the reference timing is approaching, the timing indicator mark 36 starts at the generation position to move while changing the direction in accordance with the beat, to thereby allow the player to feel the rhythm of the music with ease.

Note that, the above description has been given of the case where the timing indicator mark 36 occurs in the generation position a given time before the reference timing and then the direction change timing arrives k/n (k: natural number) of a bar before the reference timing, but it suffices that the timing indicator mark 36 changes the direction at the timing at which the beat of the music is played. In other words, it suffices that the direction change timing corresponding to the beat of the music is defined in the moving path data.

For example, it is assumed that the guide showing period is mbars, and the reference timing arrives at a time t (here, t represents a time point of a multiple of 1/n of a bar) during the music in the meter of n beats. For example, after the timing indicator mark 36 occurs at a timing m bars before or a timing prior to the timing, the first direction change may be made "m−1/n" bars before the time t, and after that, the direction may be changed every time the direction change timing k/n of a bar before (k: k<m*n−1) the time t arrives.

For example, in a case of m=1 bar, the meter of n=3 beats, and t=20th bar, the timing indicator mark 36 occurs in a case where the current time point becomes the 19th bar, the direction change timing arrives in the "19+1/3"-th bar and the "19+2/3"-th bar, and then the reference timing arrives in the 20th bar.

Further, the description has been given of the case where the direction is changed by rotating the moving direction of the timing indicator mark 36 clockwise by 90° in the case where the direction change timing arrives, but a method of changing the moving direction is not limited thereto as long as the moving direction of the timing indicator mark 36 changes by a predetermined angle before and after the direction change. Alternatively, for example, the moving direction may be rotated counterclockwise.

Further, the description has been given of the case where the timing indicator mark 36 occurs in the generation position in a case where the guide showing period arrives and starts moving immediately after that, but the timing indicator mark 36 may start moving after occurring in the generation position and then waiting for a predetermined time. For example, the timing indicator mark 36 may occur three bars before the reference timing and wait for one bar before starting moving.

[7. Processing Executed on Game Device]

Figure 18:
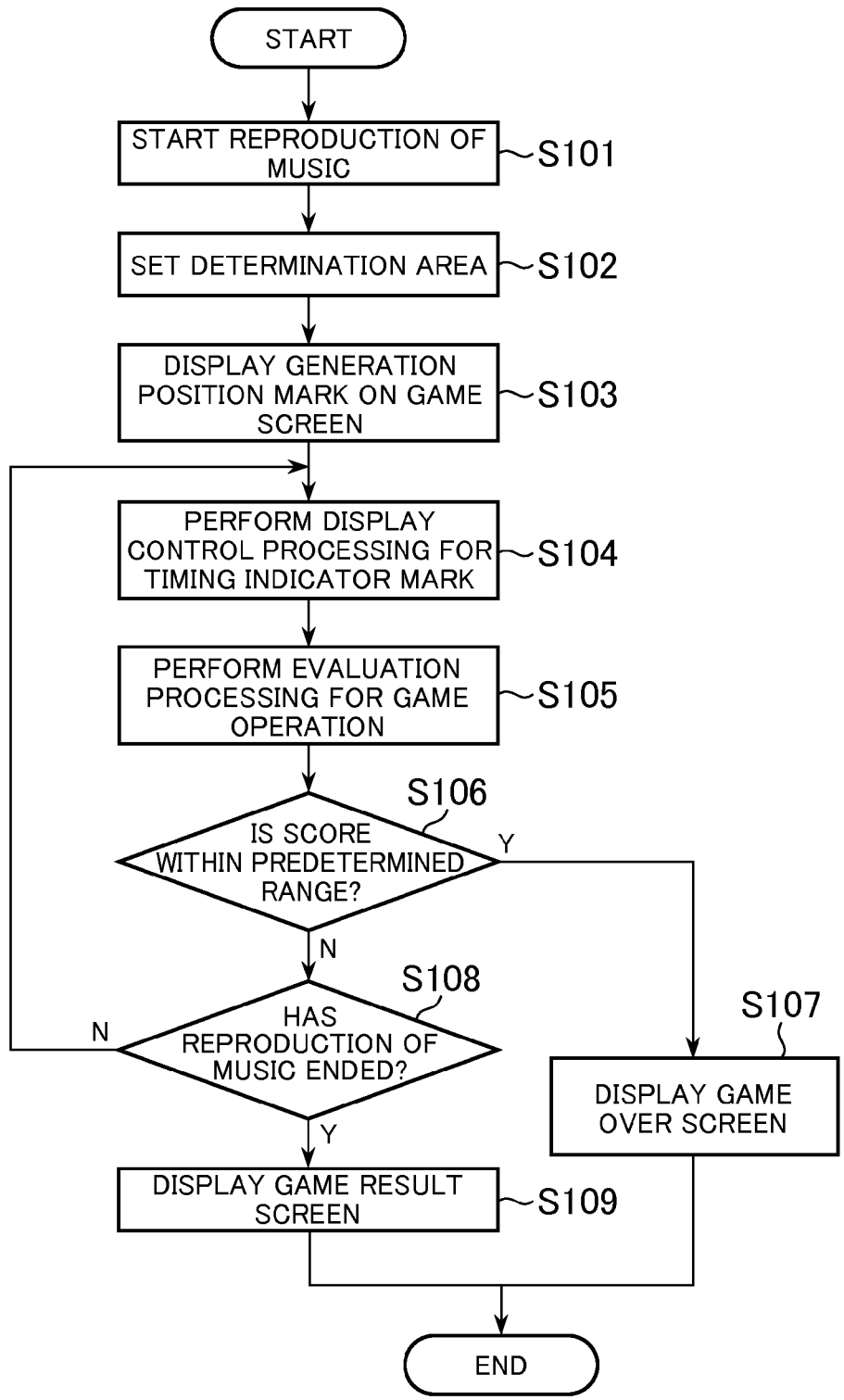
FIG. 18 is a flowchart showing an example of processing executed on the game device.

FIG. 18 is a flowchart showing an example of processing executed on the game device 20. The processing of FIG. 18 is executed by the control unit 21 operating in accordance with the program read from the optical disc.

As shown in FIG. 18, first, the control unit 21 starts the reproduction of the music (S101). The control unit 21 builds a three-dimensional space in the main storage unit 22, and sets the determination area 60 therein (S102). The control unit 21 sets a plurality of generation positions on the game screen 30, and displays the generation position mark 34 on the game screen 30 (S103).

Note that, in S102, for example, the determination area 60 is set so as to satisfy a predetermined positional relation with the back P7 of the player indicated by the player position information acquired from the position detecting device 1. In S103, a plurality of generation position marks 34 are displayed around the player image 32. In other words, the positional relation between the player image 32 and the generation position mark 34 corresponds to the positional relation between the back P7 of the player and the determination area 60.

The control unit 21 refers to the reference timing data and the moving path data to perform display control processing for the timing indicator mark 36 on the game screen 30 (S104).

Figure 19:
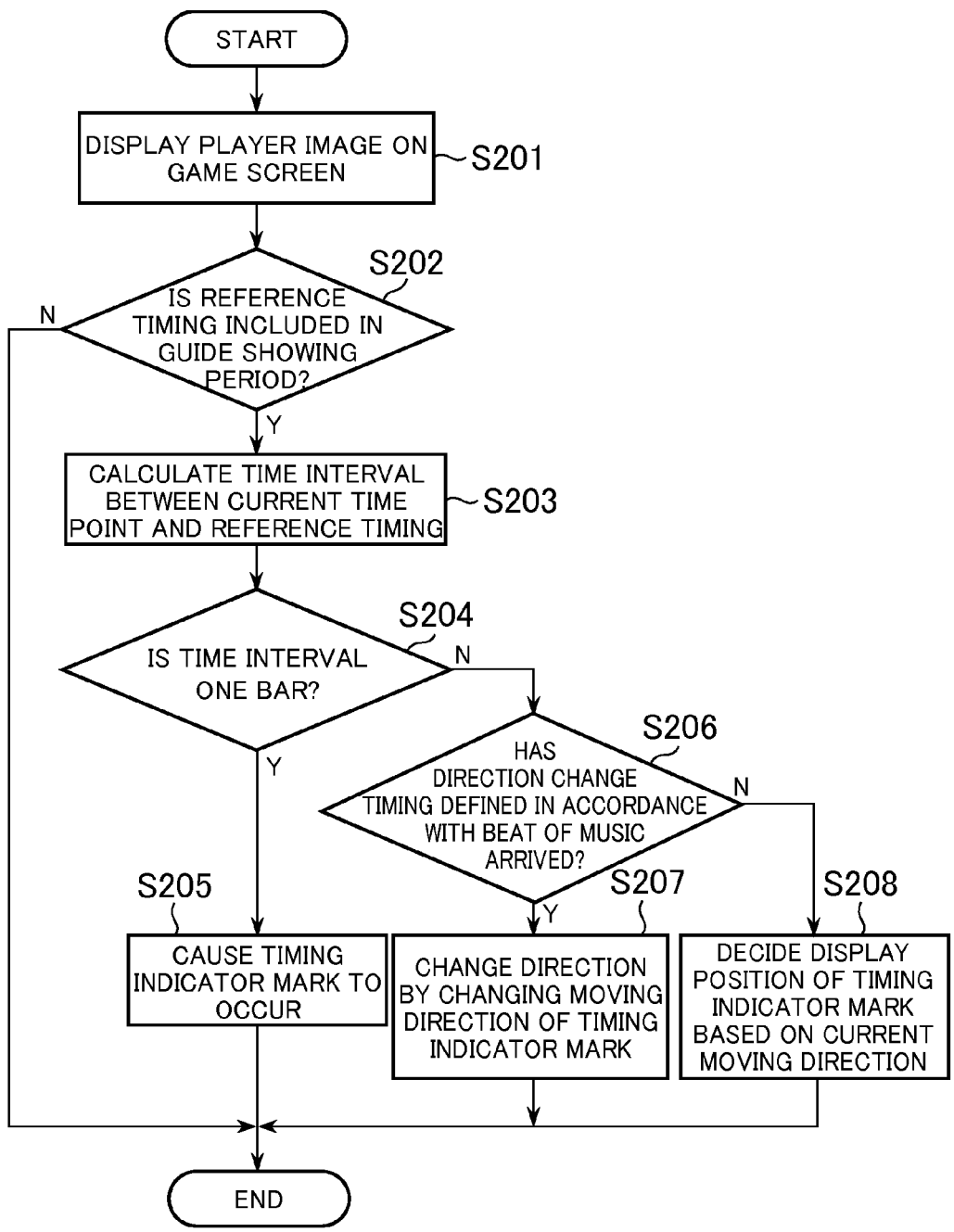
FIG. 19 is a flowchart showing an example of display control processing executed in S104.

FIG. 19 is a flowchart showing an example of the display control processing executed in S104. The processing illustrated in FIG. 19 is performed based on the reference timing indicated by each of "A" to "H" of the reference timing data. In other words, the display control processing described below is executed for each of the timing indicator marks 36A to 36H for showing the reference timing associated with each of the generation position marks 34A to 34H. Note that, here, description is given of a case where the display control processing for the timing indicator mark 36A is performed based on the data of "A" of the reference timing data.

First, as shown in FIG. 19, the control unit 21 displays the player image 32 on the game screen 30 based on the photographed image acquired from the position detecting device 1 (S201).

The control unit 21 refers to the reference timing data to determine whether or not the reference timing is included in the guide showing period (S202). For example, it is determined whether or not "A" of the reference timing data becomes "1" during the period from the current time point until the end of one bar.

When it is not determined that the reference timing is included in the guide showing period (S202; N), the present processing ends, and the procedure shifts to S105.

When it is determined that the reference timing is included in the guide showing period (S202; Y), the control unit 21 calculates a time interval U between the current time point and the reference timing within the guide showing period (S203). In other words, the time interval U between the time at which "A" of the reference timing data is "1" within the guide showing period and the current time point is calculated.

The control unit 21 determines whether or not the time interval U calculated in S203 is one bar (S204). In other words, it is determined whether or not the time interval U is the same as the length of the guide showing period.

When it is determined that the time interval U is one bar (S204; Y), the control unit 21 causes the timing indicator mark 36A to occur in the position of the generation position mark 34A (S205). In other words, the reference timing of "A" is newly included in the guide showing period, and hence the timing indicator mark 36A occurs in the position of the generation position mark 34A.

When it is not determined that the time interval U is one bar (S204; N), the control unit 21 refers to the moving path data to determine based on the time interval U whether or not the direction change timing defined in accordance with the beat of the music has arrived (S206). The direction change timing is defined for the moving path data, and here, it is determined that the direction change timing has arrived in a case where the time interval U is k/n of a bar (here, ¼th of a bar, ²⁄₄th of a bar, or ¾th of a bar).

When it is determined that the direction change timing has arrived (S206; Y), the control unit 21 changes the direction of the timing indicator mark 36A by changing the moving direction thereof in accordance with the moving path indicated by the moving path data (S207). Here, the moving path data is expressed so that the moving direction of the timing indicator mark 36A rotates clockwise by 90°.

When it is not determined that the direction change timing has arrived (S206; N), the control unit 21 decides the display position of the timing indicator mark 36A based on the current moving direction in accordance with the moving path indicated by the moving path data (S208). For example, the display position of the timing indicator mark 36A is decided so that the distance from the direction change position becomes larger as the time interval U becomes smaller.

Note that, the above description has been given of the display control of the timing indicator mark 36A, but the display control is performed for the timing indicator marks 36B to 36H based on the data of "B" to "H", respectively, of the reference timing data in the same manner as described above. In other words, in the above description, "A" can be read as any one of "B" to "H".

Returning to FIG. 18, after the display control for the timing indicator mark 36 is performed in S104, the control unit 21 performs evaluation processing for the game operation (S105).

Figure 20:
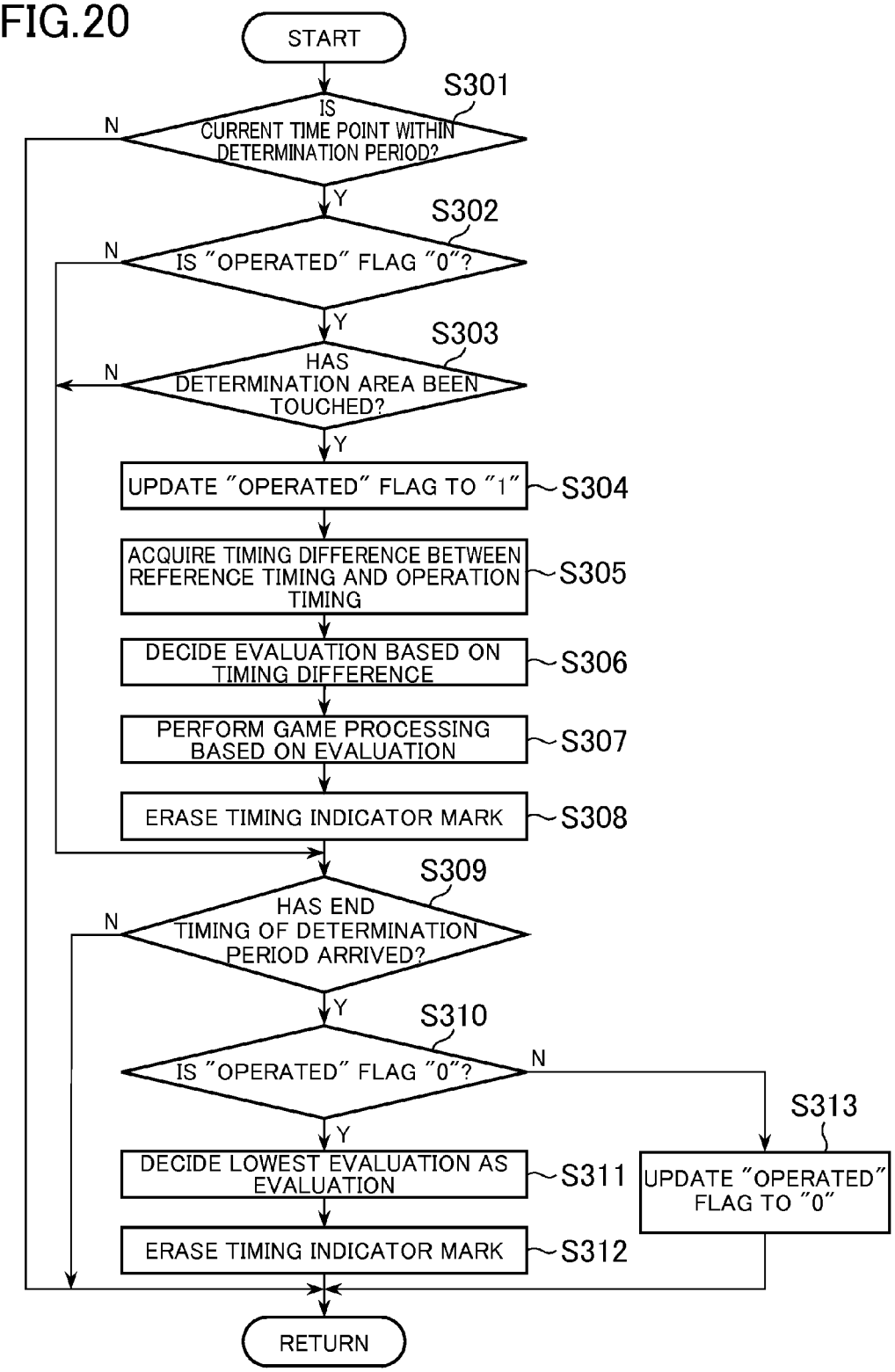
FIG. 20 is a flowchart showing an example of evaluation processing for the game operation.

FIG. 20 is a flowchart showing an example of the evaluation processing for the game operation. The processing illustrated in FIG. 20 is executed for the eight game operations corresponding to the determination areas 60A to 60H. Note that, here, description is given of a case of evaluating the game operation in which the player touches the determination area 60A. The evaluation processing for the game operations in which the player touches the other determination areas 60B to 60H is performed by reading "A" described below as "B" to "H".

As shown in FIG. 20, first, the control unit 21 determines whether or not the current time point is within a determination period (S301).

Figure 21:
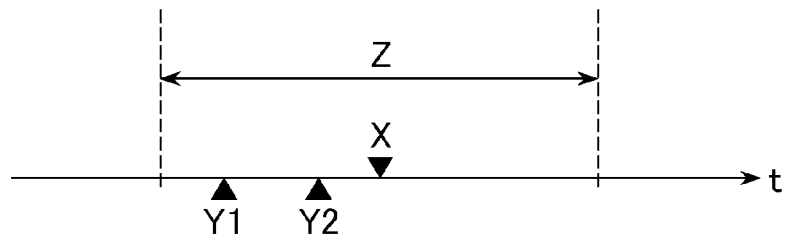
FIG. 21 explains a determination period.

FIG. 21 explains the determination period. In FIG. 21, the t-axis represents a time axis. "X" represents a timing at which the determination area 60A should be touched. In other words, "X" represents the reference timing corresponding to the determination area 60A, and is a time at which "A" of the reference timing data is "1". "Y1" and "Y2" represent timings at which the determination area 60A is touched. In other words, "Y1" and "Y2" represent the operation timings.

For example, the determination period is set for each reference timing. In FIG. 19, "Z" represents the determination period. The determination period (Z) is a period including the reference timing (X), a period between the reference timing (X) and a timing which is earlier than the reference timing (X) by a predetermined time, and a period between the reference timing (X) and a timing which is later than the reference timing (X) by a predetermined time. The determination period (Z) illustrated in FIG. 21 is a fixed period with the reference timing (X) set as a center.

In the determination period (Z), the first operation timing within the period is handled as an evaluation subject. For example, in the example of FIG. 21, two operation timings (Y1 and Y2) exist in the determination period (Z). In this case, the first operation timing (Y1) is set as a comparison subject with the reference timing (X). The second operation timing (Y2) and the subsequent operation timings are excluded from the comparison subjects with the reference timing (X). The setting is thus performed in order to appropriately perform the evaluation even in a case where the player repeatedly touches the determination area 60A near the reference timing (X).

Returning to FIG. 20, when it is determined that the current time point is not within the determination period (S301; N), the control unit 21 ends the present processing. In short, the control unit 21 executes the processing of S106 of FIG. 18.

On the other hand, when it is determined that the current time point is within the determination period (S301; Y), the control unit 21 determines whether or not an "operated" flag is "0" (S302). The "operated" flag is information stored in the main storage unit 22 or the like and indicates whether or not the determination area 60A has been touched during the current determination period. The "operated" flag assumes a value of 0 or 1. "0" indicates that the determination area 60A has not been touched. On the other hand, "1" indicates that the determination area 60A has been touched.

When it is not determined that the "operated" flag is "0" (S302; N), the procedure shifts to S309.

On the other hand, when it is determined that the "operated" flag is "0" (S302; Y), the control unit 21 determines whether or not the determination area 60A has been touched (S303). The determination is performed by determining whether or not the set of the three-dimensional coordinates of each body part of the player indicated by the player position information is within the determination area 60A.

When it is not determined that the determination area 60A has been touched (S303; N), the procedure shifts to S309. On the other hand, when it is determined that the determination area 60A has been touched, the control unit 21 updates the "operated" flag to "1" (S304).

In addition, the control unit 21 acquires the timing difference ($\Delta T$) between the reference timing and the operation timing (S305). The timing difference ($\Delta T$) assumes a negative value in the case where the operation timing is earlier than the reference timing. On the other hand, the timing difference ($\Delta T$) assumes a positive value in the case where the operation timing is later than the reference timing. The operation timing may be a timing at which it is determined in S303 that the determination area 60A has been touched, or may be a time point at which the processing of S305 is executed.

The control unit 21 decides the evaluation based on the timing difference ($\Delta T$) acquired in S305 (S306). For example, the evaluation is decided based on the data illustrated in FIG. 13. The control unit 21 performs game processing based on the evaluation decided in S306 (S307), and erases the timing indicator mark 36 (S308). The game processing performed here includes display effect processing for the game screen 30 and processing for increasing/decreasing a score indicated by the game situation data.

The control unit 21 determines whether or not an end timing of the determination period has arrived (S309). When it is not determined that the end timing of the determination period has arrived (S309; N), the procedure shifts to S106.

On the other hand, when it is determined that the end timing of the determination period has arrived (S309; Y), the control unit 21 determines whether or not the "operated" flag is "0" (S310). The "operated" flag is "0" in a case where the determination area 60A has not been touched during the determination period.

When it is determined that the "operated" flag is "0" (S310; Y), the control unit 21 decides the lowest evaluation as the evaluation (S311), and erases the timing indicator mark 36A (S312). In this case, for example, the score decreases by a predetermined value. Then, the procedure shifts to S106.

On the other hand, when it is not determined that the "operated" flag is "0" (S310; N), the control unit 21 updates the "operated" flag to "0" (S313). Then, the procedure shifts to S106.

Returning to FIG. 18, the control unit 21 determines whether or not the score is within a predetermined range (S106). When it is determined that the score is within the predetermined range (S106; Y), the control unit 21 displays a game over screen (S107), and ends the present processing.

On the other hand, when it is not determined that the score is within the predetermined range (S106; N), the control unit 21 determines whether or not the reproduction of the music has ended (S108). When it is not determined that the reproduction of the music has ended (S108; N), the procedure returns to S104. On the other hand, when it is determined that the reproduction of the music has ended (S108; Y), the control unit 21 displays a game result screen (S109), and ends the present processing.

On the game device 20 described above, when the reference timing at which the player should perform the game operation is approaching, the timing indicator mark 36 occurs in the generation position mark 34, and the timing indicator mark 36 moves on the game screen 30 while changing the direction in accordance with the beat of the music. The timing indicator mark 36 changes the direction while appearing to keep the beat of the music, and hence the player feels the rhythm of the music with ease, and therefore grasps the reference timing with ease. For example, even in a case where it is difficult to hear the music due to noise around the player or other such factor, the rhythm of the music is easily felt from the motion of the timing indicator mark 36.

Further, in particular, after the timing indicator mark 36 occurs in the generation position at the timing which is earlier than the reference timing by m bars (m: natural number) or a timing prior to the timing, the timing indicator mark 36 that has occurred moves in the initial moving direction and to make the first direction change at a timing which is earlier than the reference timing by "m−1/n" bars, and after that, the timing indicator mark 36 is moved to the target position while changing the direction every time the timing which is earlier than the reference timing by k/n of a bar arrives, with the result that the number of beats played during one bar corresponds to the number of times that the timing indicator mark 36 changes the direction during the one bar, which allows the player to feel the rhythm of the music with ease.

[7. Modified Example]

The present invention is not limited to the embodiment and modified example described above. Various modifications may be made as appropriate without departing from the gist of the present invention.

(1) For example, in a case where a large number of timing indicator marks 36 are displayed on the game screen 30, it may be difficult for the player to grasp where the timing indicator marks 36 have occurred from and are moving toward. Therefore, in the case where the timing indicator mark 36 occurs, a color, a size, or the like of the generation position mark 34 may be changed in order to make it easy for the player to grasp where the timing indicator mark 36 has occurred from and is returning to.

The guide unit 58 according to this modified example displays a image (for example, generation position mark 34) in the generation position or the target position on the game screen 30, and changes the image in the case where the guide image (for example, timing indicator mark 36) occurs or the case where the guide image changes the direction.

The case where the timing indicator mark 36 occurs is, for example, a case where the reference timing is included in the guide showing period. The case where the timing indicator mark 36 changes the direction is a case where the timing indicator mark 36 has reached the direction change position, and is a case where the direction change timing has arrived.

To "change the generation position mark 34" means to change a display mode of the generation position mark 34, and is at least one of, for example, to change the image data itself on the generation position mark 34 to another image data, to change a shape, the size, the color, or a brightness of the generation position mark 34, and to cause the generation position mark 34 to flash on and off.

Figure 22:
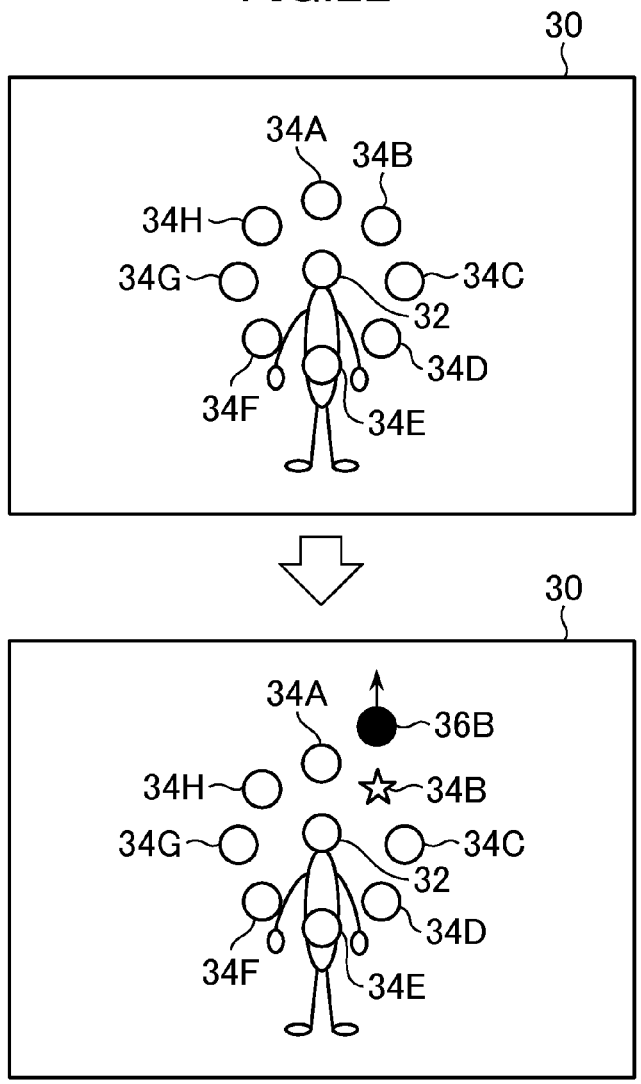
FIG. 22 shows a game screen displayed according to Modified Example (1).

FIG. 22 shows the game screen 30 displayed according to Modified Example (1). As shown in FIG. 22, in the case where the reference timing is not included in the guide showing period, the timing indicator mark 36 is not displayed on the game screen 30, and hence the generation position mark 34 does not change. For example, in the case where the reference timing is included in the guide showing period, in other words, in the case where the timing indicator mark 36 has occurred to start moving, the generation position mark 34 changes.

In the example illustrated in FIG. 22, "B" of the reference timing data within the guide showing period is "1", and the timing indicator mark 36B occurs in the generation position mark 34B. Then, the generation position mark 34B changes from a circular-shaped image to a star-shaped image. When the timing indicator mark 36B returns to the generation position mark 34B by repeating the direction change (in other words, when the reference timing arrives), the generation position mark 34 returns to the original shape. In other words, the generation position mark 34B returns from the star-shaped image to the circular-shaped image.

Note that, with reference to FIG. 20, the case where the generation position mark 34 changes when the timing indicator mark 36 occurs has been described, but as described above, the generation position mark 34 may be changed in the case where the timing indicator mark 36 changes the direction. For example, in a case where three direction change positions (three direction change timings) exist in the music in the quadruple meter, the generation position mark 34 may be changed in a case where the timing indicator mark 36 reaches any one of the direction change positions (in a case where any one of the direction change timings arrives).

According to Modified Example (1), the generation position mark 34 changes to thereby make it easy for the player to grasp where the timing indicator mark 36 has occurred from and is moving toward. As a result, it is easy for the player to grasp which determination area 60 should be touched.

(2) Further, for example, in a case where a plurality of timing indicator marks 36 are displayed on the game screen 30, it may be difficult to grasp whether the timing indicator mark 36 has just occurred or has already changed the direction. Therefore, the timing indicator mark 36 may be changed in the case of changing the direction.

The guide unit 58 according to Modified Example (2) changes the guide image in the case where the guide image (for example, timing indicator mark 36) changes the direction. The timing indicator mark 36 changes before and after the timing indicator mark 36 changes the direction.

To "change the timing indicator mark 36" means to change the display mode of the timing indicator mark 36 in the same manner as the generation position mark 34, and is at least one of, for example, to change the image data itself on the timing indicator mark 36 to another image data, to change the shape, the size, the color, or the brightness of the timing indicator mark 36, and to cause the timing indicator mark 36 to flash on and off.

For example, it is determined whether or not the direction change timing has arrived. Then, the timing indicator mark 36 takes a first display mode (for example, circular shape) before the direction change timing arrives, and the timing indicator mark 36 takes a second the display mode (for example, star shape) different from the first display mode in the case where the direction change timing arrives.

FIG. 23 shows the game screen 30 displayed according to Modified Example (2). As shown in FIG. 23, for example, the timing indicator mark 36 is the circular-shaped image until the timing indicator mark 36 reaches the third direction change timing. When the timing indicator mark 36 reaches the third direction change timing, the timing indicator mark 36 changes to the star-shaped image, and moves toward the generation position mark 34B.

According to Modified Example (2), the timing indicator mark 36 changes before and after the direction change to thereby make it easy for the player to grasp whether or not the timing indicator mark 36 has changed the direction. As a result, it is easy for the player to grasp the reference timing.

Note that, in FIG. 23, the case where the timing indicator mark 36 changes in the case where the third direction change timing arrives has been described, but the timing indicator mark 36 may be changed in a case where the first or second direction change timing arrives, or may be changed every time the direction change timing arrives.

(3) Further, for example, an image other than the timing indicator mark 36 may move along the moving path of the timing indicator mark 36.

Figure 24:
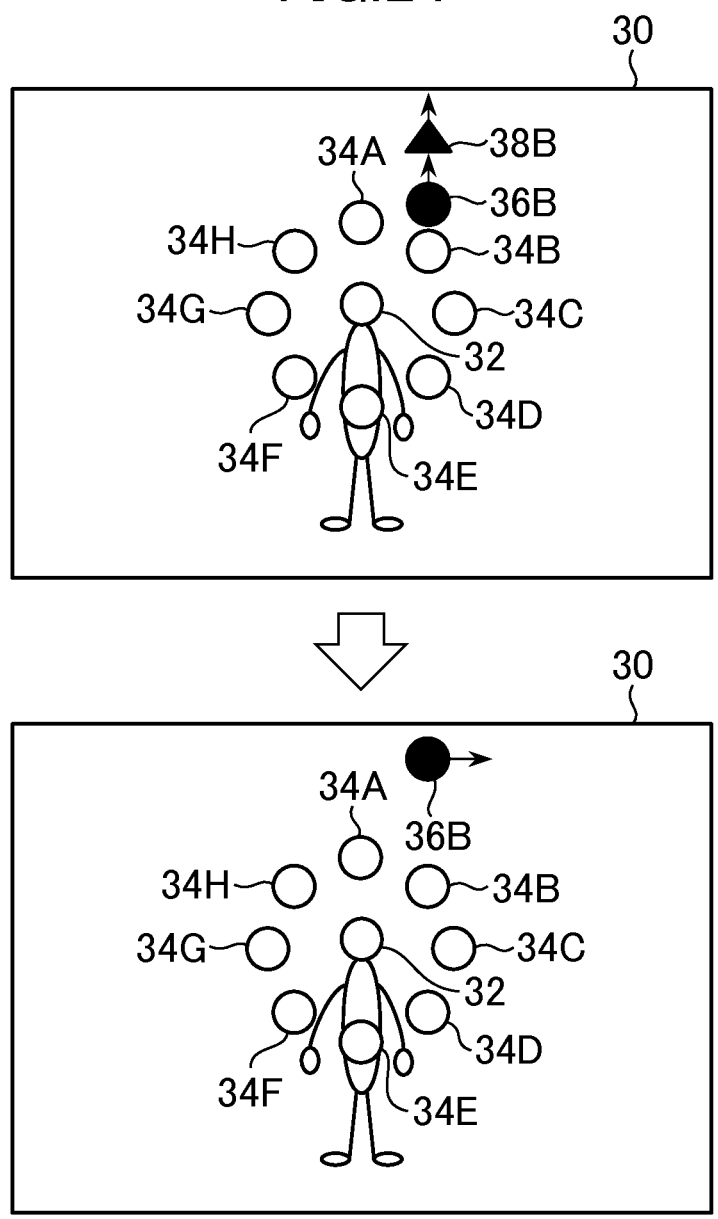
FIG. 24 shows an example of the game screen according to Modified Example (3).

FIG. 24 shows an example of the game screen 30 according to Modified Example (3). As shown in FIG. 24, for example, a disturbing mark 38B is displayed on the path of the timing indicator mark 36B. The disturbing mark 38B does not serve to show the reference timing, or does not move based on an interval between the current time point and the reference timing. For example, the disturbing mark 38B occurs in the generation position mark 34B, and then moves straight forward without changing the direction, to be erased from the game screen 30.

The game device 20 according to Modified Example (3) includes means for moving, on the game screen 30, a dummy guide image (for example, disturbing mark 38B) from the generation position to any one of the direction change positions, in which the guide image changes the direction, on the same path as the guide image (for example, timing indicator mark 36B) and then moving the dummy guide image without changing the direction at the direction change position. The above-mentioned means is implemented by, for example, the game execution unit 54.

The disturbing mark 38B moves on without changing the direction even when reaching the direction change position. In other words, as shown in FIG. 22, the disturbing mark 38B may move on the game screen 30 while maintaining the moving direction, to be erased from the game screen 30. For example, data indicating the moving path of the disturbing mark 38B is stored in the game data storage unit 52 in advance, and the disturbing mark 38B moves based on the data.

Note that, in a screen example illustrated in FIG. 24, the case where the disturbing mark 38B moves without changing the direction at the first direction change position among the three direction change positions has been described, but the direction may be changed at the first direction change position without changing in the second direction change position. Further, the direction may be changed at the second direction change position and may be inhibited from changing at the third direction change position.

Further, the disturbing mark 38B may have the same shape as the timing indicator mark 36B, or may have a shape different therefrom. For example, the disturbing mark 38B may be an image which has the same shape as the timing indicator mark 36B but is different therefrom only in color. Further, for example, the disturbing mark 38B may be moved at the same speed as the timing indicator mark 36B or may be moved at a speed different therefrom.

According to Modified Example (3), a disturbing mark 38 is displayed on the game screen 30, which can improve the entertaining characteristics of the game.

(4) Further, for example, in Modified Example (3), the case where the disturbing mark 38 is moved to thereby mislead the player and improve the entertaining characteristics of the game has been described, but the timing indicator mark 36 may be moved while making a direction change corresponding to a beat different from the beat of the music.

For example, in the case of the embodiment, the timing indicator mark 36 moves while changing the direction along the moving path in any one of the patterns A to C corresponding to the four-beat music, but a part of the timing indicator marks 36 may be moved while changing the direction along the moving path in the pattern D corresponding to the three-beat music. The part of the timing indicator marks 36 moves while appearing to keep a three-beat rhythm, and hence the player feels the three-beat rhythm from the motion of the timing indicator mark 36, but in actuality, the player should perform the game operation in tune with the four-beat music, which can improve the entertaining characteristics of the game.

Figure 25:
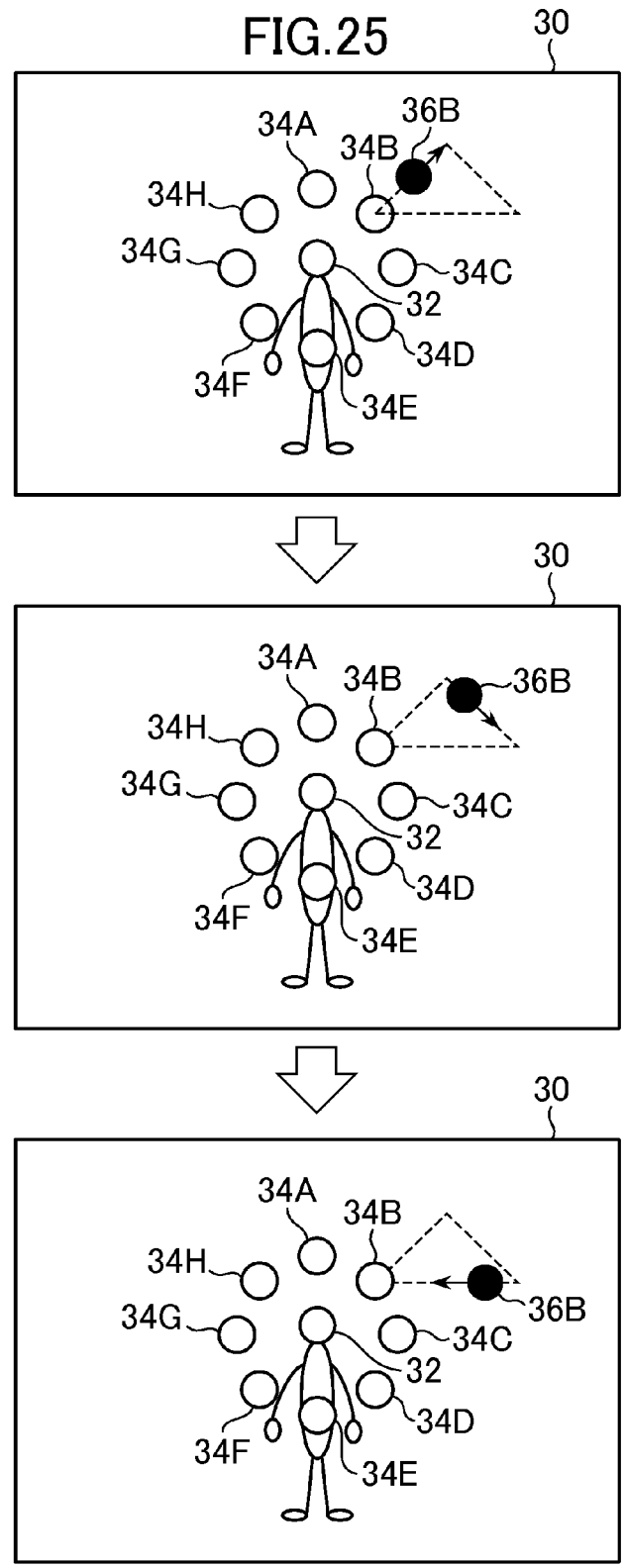
FIG. 25 shows an example of the game screen according to Modified Example (4).

FIG. 25 shows an example of the game screen 30 according to Modified Example (4). As shown in FIG. 25, for example, the timing indicator mark 36 for showing a part of the reference timings moves while making the direction change corresponding to the three-beat music. The direction change corresponding to the three-beat music means that, for example, two direction change timings arrive within the guide showing period.

For example, as shown in FIG. 25, the timing indicator mark 36B occurs in the generation position mark 34B to move in a predetermined direction, and then moves in a moving direction rotated from the original moving direction clockwise by 120°. After that, the timing indicator mark 36B moves in a moving direction further rotated from this rotated moving direction clockwise by 120° to return to the generation position mark 34B. In other words, each side of the triangle having the generation position mark 34B as one of vertices thereof is set as the moving path of the timing indicator mark 36B.

On the other hand, the other normal timing indicator marks 36 move along the sides of a rectangle while making the direction change corresponding to the four-beat music in the same manner as in the embodiment, and hence the player plays the game without being misled by the rhythm of the disturbing mark 38B.

The guide unit 58 according to Modified Example (4) includes first guide means for moving the timing indicator mark 36 based on the reference timing data while changing the direction of the timing indicator mark 36 in accordance with the beat of the music, and second guide means for moving the timing indicator mark 36 while changing the direction of the timing indicator mark 36 in accordance with a beat different from the beat of the music. For example, of the reference timings indicated by the reference timing data, the timing indicator mark 36 for showing the part of the reference timings is moved along the moving path associated with the beat different from the beat of the music.

The part of the reference timings may be defined in advance, or may be dynamically defined. To be dynamically defined means a timing defined in accordance with progress of the game. The guide unit 58 may include switching means for switching the means for indicating the player the reference timing between the first guide means and the second guide means based on a game result of the player. For example, in the case where the score indicated by the game situation data is within a predetermined range (for example, equal to or larger than a reference value), the timing indicator mark 36 may be moved along the moving path corresponding to the beat different from the beat of the music.

The guide unit 58 reads information indicating the moving path associated with the beat different from the beat of the music from among the moving paths stored in the game data storage unit 52, and moves the timing indicator mark 36 based on the information. For example, while the timing indicator mark 36 is being moved based on the pattern A associated with the four-beat music, the timing indicator mark 36 is moved based on the pattern D associated with the three-beat music.

According to Modified Example (4), for example, even in the case where the user plays in tune with the music in the quadruple meter, the timing indicator mark 36 for showing the part of the reference timings is moved while appearing to keep the triple meter, and a meter different from the meter of the music is felt from the motion of the part of the timing indicator marks 36, which can improve the entertaining characteristics of the game.

(5) Further, for example, a moving distance and the moving speed of the timing indicator mark 36 for showing the subsequent reference timing may be changed in accordance with an operation amount of the game operation. Here, the game operation is performed by the player moving his/her body so as to hit the generation position mark 34 at the timing at which the timing indicator mark 36 coincides with the generation position mark 34. The moving distance and the moving speed of the timing indicator mark 36 for showing the subsequent reference timing may be changed in accordance with the speed of the body part exhibited when the hitting operation is performed.

The game operation detection unit 50 according to Modified Example (5) includes means for detecting the operation amount of the game operation. Here, a change amount of the body part of the player corresponds to the "operation amount".

The guide unit 58 includes means for deciding the moving distance of the guide image based on the operation amount of the game operation in the case where the evaluation of the game operation is performed. The guide unit 58 includes means for changing at least one of: the moving distance and the moving speed of the guide image (for example, timing indicator mark 36) from the generation position up to the first direction change position; the moving distance and the moving speed of the guide image from the direction change position up to the subsequent direction change position; and the moving distance and the moving speed of the guide image from the last direction change position up to the target position, based on the operation amount of the game operation in the case where the evaluation of the game operation is performed.

Figures 26, 27:
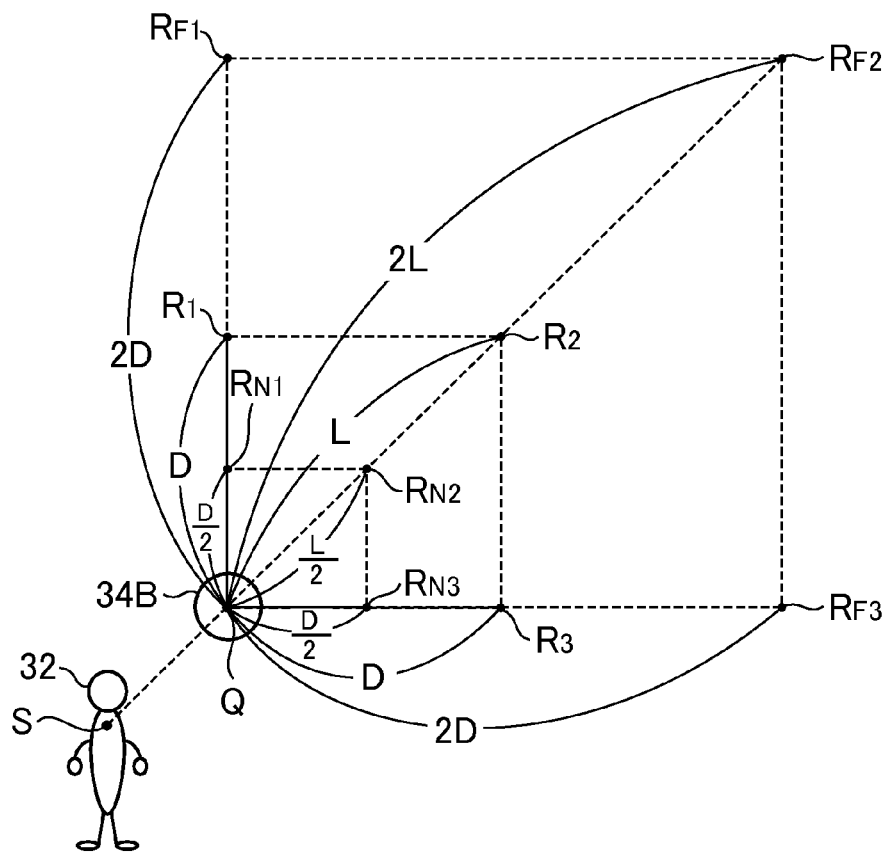
FIG. 26 shows association between: a change amount of player position information; and a moving distance and a moving speed of the timing indicator mark.
FIG. 27 shows the moving path followed by the timing indicator mark in a case where the moving distance and the moving speed change depending on a change in the player position information.

FIG. 26 shows association between: the change amount of the player position information; and the moving distance and the moving speed of the timing indicator mark 36. Data indicating the association is stored in, for example, the game data storage unit 52. As shown in FIG. 26, for example, the change amount (or speed) of each body part of the player indicated by the player position information is associated with the information indicating the moving distance and the moving speed of the timing indicator mark 36.

As the change amount of each body part of the player indicated by the player position information, information indicating the change amount of the position of any one of the body parts of the player during a predetermined period is stored, in other words, information relating to the speed of the body part of the player is stored. Here, description is given of a case where three kinds of values "small", "normal", and "large" corresponding to the change amount of the player position information are stored. For example, the change amount of the body part of the player is compared with a threshold value, to thereby determine which of the above-mentioned values the change in the position of the body part of the player belongs to.

The change amount of the position of the player being "large" means a case where the change in the position of the body part of the player during the predetermined period is larger than a first threshold value, for example, a case where the player performs an operation for hitting the generation position mark 34 by moving his/her hand quickly. On the other hand, the change amount of the position of the player being "small" means a case where the change in the position of the body part of the player during the predetermined period is smaller than a second threshold value (<(first threshold value))), for example, a case where the player performs an operation for hitting the generation position mark 34 by moving his/her hand slowly. The change amount of the position of the player being "normal" means a case where the change in the position of the body part of the player during the predetermined period falls within the range of from the first threshold value to the second threshold value, for example, a case where the player performs an operation for hitting the generation position mark 34 by moving his/her hand at a normal speed.

As the information indicating the moving distance of the timing indicator mark 36, information indicating how far the direction change position is set in which direction when viewed from the generation position is stored, and here, three kinds of values "near", "normal", and "far" are stored. Further, as the information indicating the moving speed of the timing indicator mark 36, information indicating the speed for moving after occurring in the generation position is stored, and here, description is given of a case where three kinds of values "slow", "normal", and "fast" are stored. For example, information relating to the distances D and L between the generation position and the direction change position and information relating to the moving speed of the timing indicator mark 36 during the movement are stored.

In the case where the evaluation of the game operation is performed, the guide unit 58 refers to the chronological change in the player position information stored in the game data storage unit 52, to identify the change amount of the body part corresponding to the game operation. Then, the guide unit 58 moves the timing indicator mark 36 based on the moving distance and the moving speed associated with the identified change amount.

FIG. 27 shows the moving path followed by the timing indicator mark 36 in a case where the moving distance and the moving speed change depending on a change in the player position information. Here, description is given of an exemplary case where the player performs the game operation for touching the determination area 60B with the right hand when the reference timing at which "B" of the reference timing data is "1" arrives. First, the change amount of the right lower arm P6 of the player is acquired based on the chronological change in the three-dimensional coordinates of the right lower arm P6 of the player in the case where the player touches the determination area 60B.

In a case where the change amount of the right lower arm P6 of the player is "small", as shown in FIG. 27, a direction change position $R_{N2}$ is set in a position spaced apart from the generation position Q (display position of the generation position mark 34B) by the distance L/2. Then, the timing indicator mark 36 moves along each side of the square in which a line segment connecting between the generation position Q and the direction change position $R_{N2}$ is set as a diagonal line thereof. In this case, the timing indicator mark 36 moves in the order of the generation position Q→a direction change position $R_{N1}$→the direction change position $R_{N2}$→a direction change position $R_{N3}$→the generation position Q, and the moving distance becomes 2D.

In a case where the change amount of the right lower arm P6 of the player is "normal", as in the embodiment, the timing indicator mark 36 moves along each side of the square in which the line segment connecting between the generation position Q and the direction change position $R_2$ is set as the diagonal line thereof. In this case, the timing indicator mark 36 moves in the order of the generation position Q→the direction change position $R_1$→the direction change position $R_2$→the direction change position $R_3$→the generation position Q, and the moving distance becomes 4D.

In a case where the change amount of the right lower arm P6 of the player is "large", as shown in FIG. 27, a direction change position $R_{F2}$ is set in a position spaced apart from the generation position Q (display position of the generation position mark 34B) by the distance 2L. Then, the timing indicator mark 36 moves along each side of the square in which a line segment connecting between the generation position Q and the direction change position $R_{F2}$ is set as a diagonal line thereof. In this case, the timing indicator mark 36 moves in the order of the generation position Q→a direction change position $R_{F1}$→the direction change position $R_{F2}$→a direction change position $R_{F3}$→the generation position Q, and the moving distance becomes 8D.

Then, the timing indicator mark 36B for showing the reference timing arriving subsequent thereto moves while changing the direction in the direction change positions set as described above. Because the direction change timings do not change, the moving speed of the timing indicator mark 36B becomes faster as the moving distance becomes longer. The moving distance and the moving speed are decided again based on the game operation performed at the reference timing shown by the timing indicator mark 36B.

According to Modified Example (5), the moving distance and the moving speed of the timing indicator mark 36 for showing the subsequent reference timing can be changed in accordance with the change in the position of the body part of the player at the reference timing, and hence it is possible to improve the entertaining characteristics of the game.

Note that, in the embodiment described so far, the case where the game operation is detected based on the player position information has been described, but pressing each button provided to the controller of the operation unit 26 may correspond to the "game operation". In this case, the direction change position may be decided in accordance with a strength with which the player has pressed the button of the operation unit 26. For example, the moving distance of the timing indicator mark 36 may become longer and the moving speed thereof may become faster as the player presses the operation unit 26 harder.

In this case, the game operation detection unit 50 detects the game operation of the player based on a detection signal received from operation means (for example, operation unit 26) including: an operation detecting unit for detecting the player's operation; and a pressure detecting unit for detecting a pressure applied to the detecting unit. For example, the button of the operation unit 26 corresponds to the operation detecting unit. For example, the operation unit 26 includes a button that can be pressed down by the player. The game operation detection unit 50 detects whether or not the game operation has been performed by acquiring the detection signal produced by the button from the operation unit 26.

Further, for example, the operation unit 26 includes a pressure sensitive sensor for detecting the pressure applied when the button is pressed down. The pressure sensitive sensor corresponds to the pressure detecting unit. The game operation detection unit 50 detects the pressure applied to the button by acquiring the detection signal produced by the pressure sensitive sensor from the operation unit 26.

Also in this case, the moving distance and the moving speed of the timing indicator mark 36 can be changed by storing association between the pressure applied to the button of the operation unit 26 and the moving distance and the moving speed of the timing indicator mark 36, and hence it is possible to improve the entertaining characteristics of the game.

Further, touching the touch panel of the operation unit 26 may correspond to the "game operation". In this case, the operation unit 26 includes, inside the touch panel, a pressure sensitive sensor for detecting a pressure applied when touched. The moving distance of the timing indicator mark 36 may be changed in accordance with the pressure applied when the player touches the touch panel. Alternatively, for example, the pressure may be detected based on a contact area of the touch panel.

Further, the "operation amount" of the game operation is not limited to the speed or the pressure of the body part described above. Alternatively, for example, the number of times that the body part of the player enters the determination area 60 or the number of times that the button of the controller is pressed may correspond to the "operation amount".

(6) Further, for example, the generation position and the target position of the timing indicator mark 36 may be changed in the case where the game operation is performed when the timing indicator mark 36 reaches the direction change position.

The guide unit 58 according to Modified Example (6) includes means for determining whether or not the game operation has been performed in the case where the guide image (for example, timing indicator mark 36) changes the direction. For example, the guide unit 58 compares the timing at which the timing indicator mark 36 reaches the direction change position (in other words, direction change timing) with the operation timing, and acquires the timing difference between the two. In the case where the timing difference is within a predetermined range, it is determined that the game operation has been performed in the case where the timing indicator mark 36 reaches the direction change position.

Further, the guide unit 58 includes means for changing the generation position and the target position based on the position of the direction change when it is determined that the game operation has been performed when the guide image (for example, timing indicator mark 36) reaches the direction change position, and causes the guide image for showing the reference timing arriving after the game operation is performed to occur in the generation position changed above and to move toward the target position changed above while changing the direction of the guide image in accordance with the beat of the music.

Figure 28:
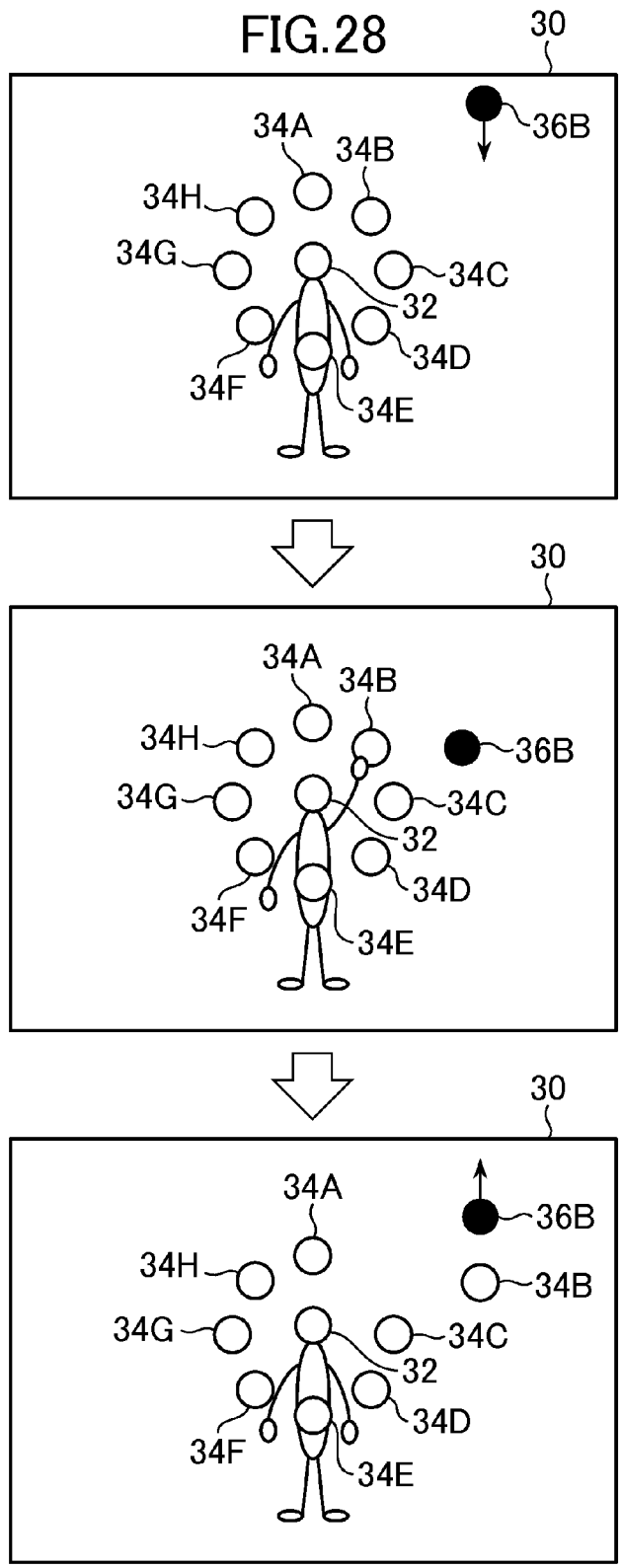
FIG. 28 shows how a generation position and a target position are changed.

FIG. 28 shows how the generation position and the target position are changed. For example, in a case where the determination area 60B is touched when the timing indicator mark 36B reaches the direction change position, the guide unit 58 changes the generation position mark 34B to the direction change position. Along with the change in the position of the generation position mark 34B, the direction change position also shifts. Note that, data indicating the generation position and the target position after the change may be stored in the game data storage unit 52 in advance. With reference to the data, the positions after the change of the generation position and the target position are identified.

According to Modified Example (6), the generation position is changed in the case where the game operation is performed when the timing indicator mark 36 reaches the direction change position, which can enhance the entertaining characteristics of the game.

Note that, in Modified Example (6), the case where the generation position is changed to the direction change position has been described, but the direction change timing (or direction change position) and information indicating the generation position after the change may be stored in the game data storage unit 52 in association with each other. In the case where the game operation is performed when the timing indicator mark 36 changes the direction, the generation position may be changed to a position associated with the direction change timing.

(7) Further, for example, the determination area 60B corresponding to the generation position mark 34B is in a position that is easy to be touched by the player with his/her hand, but the determination area 60A corresponding to the generation position mark 34A is in a position that is above the player's head and is therefore relatively hard to be touched. Therefore, the degree of difficulty of the game may be adjusted by replacing data content of "A" and data content of "B" of the reference timing data by each other based on the progress of the game.

For example, in the reference timing data, in a case where few reference timings at which the determination area 60A should be touched are set and the reference timings at which the determination area 60B should be touched are set continuously, by replacing the two by each other, the player is forced to touch the determination area 60A above his/her head continuously. For example, the game is less likely to be over in a case where the score of the player is relatively increasing, and hence the degree of difficulty of the game may be increased as described above.

The game device 20 according to Modified Example (7) further includes means for changing a first reference timing (for example, data of "A") based on a second reference timing (for example, data of "B"). Causing the value of the data of "A" at a given time point to coincide with the value of the data of "B" corresponds to "changing the reference timing" according to this modified example.

For example, the value of the data of "A" is changed from "0" to "1" in the case where the value of the data of "A" is "0" and the value of the data of "B" is "1" at the given time point. In contrast, the value of the data of "A" may be changed from "1" to "0" in the case where the value of the data of "A" is "1" and the value of the data of "B" is "0" at the given time point.

FIG. 29 shows a relation between a condition relating to the situation of the game being executed and a method of changing the reference timing. Data indicating the relation of FIG. 29 is stored in, for example, the game data storage unit 52.

The condition relating to the situation of the game represents information indicating a range of the value that can be assumed by the game situation data, and, for example, a range of the score indicated by the game situation data is stored. Alternatively, the condition may be, for example, whether or not the elapsed time of the music is within a predetermined range in the game being executed. As the method of changing the reference timing, information indicating which reference timing is changed by what reference timing is stored.

For example, with reference to the game situation data, it is determined whether or not the condition illustrated in FIG. 29 is satisfied. When the condition is satisfied, the reference timing is changed based on the method of the changing associated with the condition. For example, in the case of the data storage example illustrated in FIG. 29, "A" and "B" of the reference timing data are replaced by each other in the case where the score indicated by the game situation data is within the predetermined range.

Figure 30:
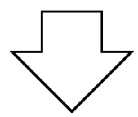
FIG. 30 shows a data storage example in a case where the reference timing is changed.

FIG. 30 shows a data storage example in a case where the reference timing is changed. In the data storage example illustrated in FIG. 30, for example, before the reference timing is changed, the data of "A" has relatively many "0"s and few "1"s. Meanwhile, for example, before the reference timing is changed, the data of "B" has relatively many "1"s and few "0"s. In a case where the reference timing is set in this manner, the player rarely touches the determination area 60A that is relatively hard to be touched, while the player often touches the determination area 60B that is relatively easy to be touched, and hence the degree of difficulty of the game becomes relatively low.

On the other hand, when "A" and "B" of the reference timing data are replaced by each other as shown in FIG. 30, the data of "A" has relatively many "1"s and few "0"s, while the data of "B" has relatively many "0"s and few "1"s. In a case where the reference timing is set in this manner, the player often touches the determination area 60A that is relatively hard to be touched, while the player rarely touches the determination area 60B that is relatively easy to be touched, and hence the degree of difficulty of the game becomes relatively high compared with before the replacement.

The guide unit 58 according to Modified Example (7) moves the image on the game screen 30 from a second generation position (for example, position of the generation position mark 34B) to a first generation position (for example, position of the generation position mark 34A) in the case where the first reference timing (for example, data of "A") is changed or moves the image from a second target position to a first target position, to thereby show the player that first reference timing data is rewritten into second reference timing data.

FIG. 31 shows a screen transition of the game screen 30 in a case where the reference timing is replaced. As shown in FIG. 31, in the case where "A" and "B" of the reference timing data are replaced by each other, the display control processing is performed in such a manner that the generation position mark 34A and the generation position mark 34B are replaced by each other. Then, the timing indicator mark 36A continuously occurs from above the head of the player image 32. In this case, the player touches the determination area 60A in accordance with the movement of the timing indicator mark 36A.

According to Modified Example (7), the degree of difficulty of the game can be adjusted during the progress of the game.

Note that, the above description has been given of the case where "A" and "B" of the reference timing data are replaced by each other, but the method of the changing is not limited to the above-mentioned example as long as one piece of the reference timing data is replaced by another piece of the reference timing data. Alternatively, for example, the reference timing data may be changed so that the generation position mark 34 rotates clockwise in such a manner that, within the reference timing data, "A" becomes "B", "B" becomes "C", and "C" becomes "D".

(8) Further, for example, in the embodiment and the modified examples, the case where the generation positions are set around the player image 32 has been described, but the generation positions set on the game screen 30 are not limited thereto. Alternatively, the generation positions may be arranged in a fan shape with the player image 32 as a reference, or may be arranged in a straight line. Further, the number of generation positions may be one.

Further, for example, the case where the generation position and the target position of the timing indicator mark 36 are the same has been described, but the generation position may be different from the target position.

FIG. 32 shows how the timing indicator mark 36 moves in a case where the generation position is different from the target position. As shown in FIG. 32, the timing indicator mark 36 may leave the generation position mark 34 and move toward a target position mark 40 displayed on the target position while changing the direction in accordance with the beat of the music. Here, the timing indicator mark 36 moves along the moving path having a line graph shape while repeating the direction change three times in tune with the music in the quadruple meter.

For example, in the case where the generation position is different from the target position in Modified Example (1), when the timing indicator mark 36 occurs or when the timing indicator mark 36 changes the direction, the target position mark 40 changes. Further, in the case where the generation position is different from the target position in Modified Example (5), the moving distance of the timing indicator mark 36 may be changed by changing the distance between the generation position and the target position in accordance with the operation amount of the game operation.

Further, in the case where the generation position is different from the target position in Modified Example (6), the position of the target position mark 40 may be changed along with the change in the position of the generation position mark 34. Further, in the case where the generation position is different from the target position in Modified Example (7), the image may be moved from a target position mark 40B to a target position mark 40A.

(9) Further, for example, the case where a timing indicator mark 34 moves in a straight line has been described, but the timing indicator mark 34 may move in a curve. In this case, the timing indicator mark 34 occurs in the generation position, then moves along a curve connecting between the generation position and the first direction change position, and changes the direction when the direction change position is reached. After that, the timing indicator mark 34 moves along a curve connecting between one direction change position and the subsequent direction change position, and changes the direction every time the timing indicator mark 34 reaches to the direction change position. Then, the timing indicator mark 34 moves along a curve connecting between the last direction change position and the target position, and reaches the target position.

(10) Further, for example, after the timing indicator mark 34 occurs and moves straight forward for a predetermined period (while a predetermined number of beats are played), the direction may be changed in accordance with the beat of the music.

FIG. 33 shows an example of the game screen 30 according to Modified Example (10). As shown in FIG. 33, after the timing indicator mark 36A occurs in the generation position 34A and then moves straight forward to the target position mark 40A during a predetermined number of bars, the direction may be changed. Also in this case, in the music in the meter of n beats, the direction is changed at the timing which is earlier than the reference timing by 1/n of a bar.

In the embodiment, after the timing indicator mark 34 occurs, the timing indicator mark 34 changes the direction every time 1/n of a bar elapses. However, in FIG. 33, for example, after having occurred, the timing indicator mark 34 moves straight forward to the target position mark 40 during one bar, and after that, changes the direction every 1/n of a bar.

Further, Modified Example (9) may be combined with Modified Example (10). In other words, the direction change of the timing indicator mark 34 may be started after the timing indicator mark 34 occurs and moves along the curve during a predetermined period. In this case, the generation position may be the same as the target position. In other words, the timing indicator mark 34 may repeat the direction change after the timing indicator mark 34 occurs in the generation position and moves along the curve during the predetermined period, and may return to the target position that is the same as the generation position.

(11) Further, for example, the embodiment or the modified example has been described by taking, as an example of the game operation, the player's moving his/her body so as to touch the determination area 60 or the player's operating the operation unit 26, but known various operations can be employed as the game operation. For example, the player's moving his/her body so that the player projected on the player image 32 touches the generation position mark 34 may correspond to the game operation.

(12) Further, for example, the description has been given above by taking an example in which means for generating the player position information based on the photographed image and the depth information (depth image) is included in the position detecting device 1, but the means for generating the player position information may be included in the game device 20. For example, the game device 20 receives the photographed image and the depth image from the position detecting device 1, and based thereon, the player position information may be generated.

(13) Further, in the above-mentioned embodiment and modified examples, description has been given of the case where the game device 20 executes a dance game, but it suffices that the game device 20 may execute the game configured so that the player performs the game operation to the music.

The invention claimed is:

1. A game device which executes a game in which a player performs a game operation to music, comprising:
   a camera which captures an image of the player at a predetermined time interval, and
   at least one processor configured to:
   obtain reference timing data indicating a reference timing at which the player should perform the game operation from a storage which stores the reference timing data;
   obtain moving path data indicating a change timing at which a guide image changes a direction of the guide image from a storage which stores the moving path data;
   indicate the reference timing to the player by moving the guide image on a game screen from a generation position to a target position while changing the direction of the guide image in accordance with a beat of the music so as to approximately match a beat timing of the music and the change timing of the guide image based on the reference timing data and the moving path data;
   obtain position information indicating a position of a body part of the player based on the captured images;
   detect the game operation by the player based on determining whether the body part indicated by the position information is included in a predetermined area; and
   evaluate the game operation by the player, based on an operation timing at which the player performs the game operation and the reference timing indicated by the reference timing data.

2. The game device according to claim 1, wherein the at least one processor indicates the reference timing to the player by moving the guide image from the generation position to the target position while changing the direction of the guide image at a timing defined in accordance with the beat of the music based on the reference timing data.

3. The game device according to claim 1, wherein:
   the at least one processor indicates the reference timing to the player by causing the guide image to occur in the generation position at a timing which is earlier than the reference timing by a given time and then moves the guide image to the target position while changing the direction of the guide image, in accordance with the beat of the music in a meter of n beats (n: natural number), every time a timing which is earlier than the reference timing by k/n (k: natural number) of a bar arrives based on the reference timing data.

4. The game device according to claim 3, wherein the at least one processor indicates the reference timing to the player by causing the guide image to occur in the generation position at a timing which is earlier than the reference timing by m bars (m: natural number) or at a timing prior to the timing, then causing the guide image to make a first direction change at a timing which is earlier than the reference timing by "m−1/n" bars, and then moving the guide image to the target position while changing the direction of the guide image every time the timing which is earlier than the reference timing by k/n (k: k<m*n−1) of a bar arrives, based on the reference timing data.

5. The game device according to claim 1, wherein the at least one processor displays an image in the generation position or the target position, and changes the image in a case where the guide image occurs or in a case where the guide image changes the direction.

6. The game device according to claim 1, wherein the at least one processor changes the guide image in a case where the guide image changes the direction.

7. The game device according to claim 1, wherein at least one processor moves, on the game screen, a dummy guide image from the generation position to any one of direction change positions, in which the guide image changes the direction, on the same path as a path of the guide image and then moving the dummy guide image without changing the direction of the dummy guide image at the one of the direction change positions.

8. The game device according to claim 1, wherein the at least one processor:
indicates the reference timing to the player by moving, on the game screen, the guide image from the generation position to the target position based on the reference timing data while changing the direction of the guide image in accordance with the beat of the music; and
indicates the reference timing to the player by moving, on the game screen, the guide image from the generation position to the target position based on the reference timing data while changing the direction of the guide image in accordance with a beat different from the beat of the music.

9. The game device according to claim 8, wherein the at least one processor switches a guide method of the reference timing based on a game result of the player.

10. The game device according to claim 1, wherein the at least one processor:
detects an operation amount of the game operation; and
changes at least one of: a moving distance and a moving speed of the guide image from the generation position up to a first direction change position; the moving distance and the moving speed of the guide image from a direction change position up to a subsequent direction change position; and the moving distance and the moving speed of the guide image from a last direction change position up to the target position, based on the operation amount of the game operation in a case where an evaluation of the game operation is performed.

11. The game device according to claim 1, wherein the at least one processor:
determines whether or not the game operation has been performed in a case where the guide image changes the direction;
changes the generation position and the target position based on a position in which the direction is changed in a case where it is determined that the game operation has been performed in the case where the guide image changes the direction; and
causes the guide image, for indicating the reference timing arriving after the game operation is performed, to occur in the changed generation position and to move toward the changed target position while changing the direction in accordance with the beat of the music.

12. The game device according to claim 1, wherein the at least one processor:
detects a first kind of game operation and a second kind of game operation;
the reference timing data indicates a first reference timing at which the first kind of game operation should be performed and a second reference timing at which the second kind of game operation should be performed;
the at least one processor:
indicates the first reference timing to the player by moving, on the game screen, a first guide image from a first generation position to a first target position while changing the direction of the first guide image in accordance with the beat of the music;
indicates the second reference timing to the player by moving, on the game screen, a second guide image from a second generation position to a second target position while changing the direction of the second guide image in accordance with the beat of the music;
changes the first reference timing arriving subsequent to a current time point based on the second reference timing during execution of the game; and
indicates to the player that the first reference timing has been changed by moving an image from the second generation position to the first generation position, or moving the image from the second target position to the first target position, on the game screen in a case where the first reference timing is changed.

13. The game device according to claim 1, further comprising at least one speaker which outputs the music and wherein the at least one processor causes the guide image to move while the music is outputted from the at least one speaker.

14. A control method for a game device for executing a game in which a player performs a game operation to music, comprising:
obtaining reference timing data indicating a reference timing at which the player should perform the game operation from a storage which stores the reference timing data;
obtaining moving path data indicating a change timing at which a guide image changes a direction of the guide image from a storage which stores the moving path data;
indicating the reference timing to the player by moving the guide image on a game screen from a generation position to a target position while changing the direction of the guide image in accordance with a beat of the music so as to approximately match a beat timing of the music and the change timing of the guide image based on the reference timing data and the moving path data;

obtaining position information indicating a position of a body part of the player based on images which are captured by a camera which captures an image of the player at a predetermined time interval;

detecting the game operation performed by the player based on determining whether the body part indicated by the position information is included in a predetermined area; and evaluating the game operation by the player, based on an operation timing at which the player performs the game operation and the reference timing indicated by the reference timing data.

15. A non-transitory computer readable medium storing a program for causing a computer to function as a game device, for executing a game in which a player performs a game operation to music, the program further causing the computer to:

obtain reference timing data indicating a reference timing at which the player should perform the game operation from a storage which stores the reference timing data;

obtain moving path data indicating a change timing at which a guide image changes a direction of the guide image from a storage which stores the moving path data;

indicate the reference timing to the player by moving the guide image on a game screen from a generation position to a target position while changing the direction of the guide image in accordance with a beat of the music so as to approximately match a beat timing of the music and the change timing of the guide image based on the reference timing data and the moving path data;

obtain position information indicating a position of a body part of the player based on images which are captured by a camera which captures an image of the player at a predetermined time interval;

detect the game operation performed by the player based on determining whether the body part indicated by the position information is included in a predetermined area; and evaluate the game operation by the player based on an operation timing at which the game operation is performed by the player and the reference timing indicated by the reference timing data.

* * * * *